(12) United States Patent
Kuruvilla et al.

(10) Patent No.: US 11,144,998 B2
(45) Date of Patent: Oct. 12, 2021

(54) DYNAMIC PROVISIONING OF DATA EXCHANGES BASED ON DETECTED RELATIONSHIPS WITHIN PROCESSED IMAGE DATA

(71) Applicant: The Toronto-Dominion Bank, Toronto (CA)

(72) Inventors: Denny Devasia Kuruvilla, Toronto (CA); Paige Elyse Dickie, Toronto (CA); Gregory Richard Harper, Milton (CA); Mark Andrew Hardy, Stoney Creek (CA); Valerie Velardo, Toronto (CA); Robert Jason Rousell, Hamilton (CA); Bernard James Tarroza, Toronto (CA); Marc Philips, Montreal (CA)

(73) Assignee: The Toronto-Dominion Bank, Toronto (CA)

( * ) Notice: Subject to any disclaimer, the term of this patent is extended or adjusted under 35 U.S.C. 154(b) by 224 days.

(21) Appl. No.: 16/136,839

(22) Filed: Sep. 20, 2018

(65) Prior Publication Data
US 2020/0098048 A1 Mar. 26, 2020

(51) Int. Cl.
*G06Q 40/08* (2012.01)
*G06K 9/00* (2006.01)
(Continued)

(52) U.S. Cl.
CPC ......... *G06Q 40/08* (2013.01); *G06K 9/00268* (2013.01); *G06K 9/00369* (2013.01);
(Continued)

(58) Field of Classification Search
CPC ........ G06Q 40/08; G06N 20/00; G06N 7/005; G06K 9/00268; G06K 9/00369; G06K 2009/00322
See application file for complete search history.

(56) References Cited

U.S. PATENT DOCUMENTS 6,792,135 B1 * 9/2004 Toyama ............. G06K 9/00228
382/118
7,221,780 B1 * 5/2007 Wang ................. G06K 9/00234
340/5.83

(Continued)

FOREIGN PATENT DOCUMENTS

JP 2011123657 6/2011

OTHER PUBLICATIONS

Zhang et al., "Efficient Propagation for Face Annotation in Family Albums," MM 04, 2004 (8 pages).

*Primary Examiner* — Jamie R Kucab
*Assistant Examiner* — Pierre L Maccagno
(74) *Attorney, Agent, or Firm* — Duane Morris LLP

(57) ABSTRACT

The disclosed exemplary embodiments include computer-implemented systems, apparatuses, devices, and processes that, among other things, dynamically provision exchanges of data based on detected relationships within processed image data. For example, a network-connected apparatus may receive, from a device, image data that identifies a plurality of individuals associated with an exchange of data. Based on an analysis of the image data, the apparatus may determine a value of a first characteristic associated with each of the individuals and generate relationship data characterizing a relationship between the individuals. The apparatus may also determine candidate values of parameters that characterize the data exchange based on portions of the first characteristic values and the relationship data, transmit the candidate parameter values to the device. An application program executed by the device may cause the device to present at least a portion of the candidate parameter values within a digital interface.

22 Claims, 14 Drawing Sheets

(51) Int. Cl.
*G06N 7/00* (2006.01)
*G06N 20/00* (2019.01)

(52) U.S. Cl.
CPC ............ *G06N 7/005* (2013.01); *G06N 20/00* (2019.01); *G06K 2009/00322* (2013.01)

(56) References Cited

U.S. PATENT DOCUMENTS

| | | | |
|---|---|---|---|
| 8,165,903 B1 | 4/2012 | Owen | |
| 8,166,385 B2 | 4/2012 | Garcia-Molina et al. | |
| 8,332,244 B1 | 12/2012 | Karam et al. | |
| 8,346,578 B1 | 1/2013 | Hopkins, III et al. | |
| 8,411,966 B2* | 4/2013 | Zhang | G06T 7/77 |
| | | | 382/201 |
| 8,611,601 B2* | 12/2013 | Calman | G06K 9/00221 |
| | | | 382/103 |
| 8,832,080 B2* | 9/2014 | Zhang | G06K 9/00677 |
| | | | 707/722 |
| 8,842,882 B2* | 9/2014 | Fedorovskaya | G06F 16/20 |
| | | | 382/103 |
| 9,934,424 B2 | 4/2018 | Bostick et al. | |
| 2003/0187768 A1 | 10/2003 | Ryan et al. | |
| 2005/0147303 A1* | 7/2005 | Zhou | G06K 9/6206 |
| | | | 382/190 |
| 2005/0272023 A1 | 12/2005 | Takano et al. | |
| 2007/0242856 A1* | 10/2007 | Suzuki | G06K 9/4628 |
| | | | 382/103 |
| 2008/0219516 A1* | 9/2008 | Suzuki | G06K 9/00228 |
| | | | 382/118 |
| 2012/0239438 A1 | 9/2012 | Hemmings et al. | |
| 2013/0151523 A1 | 6/2013 | Hsi | |
| 2015/0101026 A1 | 4/2015 | Kraus | |
| 2016/0048887 A1 | 2/2016 | Joshi et al. | |
| 2016/0292871 A1* | 10/2016 | Liu | H04N 5/23229 |
| 2016/0314521 A1 | 10/2016 | Krughoff et al. | |
| 2017/0263019 A1 | 9/2017 | Song et al. | |
| 2018/0197041 A1* | 7/2018 | Krebs | G16H 30/40 |

\* cited by examiner

DYNAMIC PROVISIONING OF DATA EXCHANGES BASED ON DETECTED RELATIONSHIPS WITHIN PROCESSED IMAGE DATA

TECHNICAL FIELD

The disclosed embodiments generally relate to computer-implemented systems and processes that dynamically provision one or more exchanges of data based on a detected relationship within processed image data.

BACKGROUND

Today, consumers are comfortable interacting with financial institutions and insurance companies across channels of digital communication, especially as these consumers continue to integrate technology into aspects of their daily lives. Many financial institutions and insurance companies, however, fail to leverage these digital channels of communication and the potential mechanisms for digital interaction to improve customer experience and engagement.

SUMMARY

In some examples, an apparatus includes a communications unit, a storage unit storing instructions, and at least one processor coupled to the communications unit and the storage unit. The at least one processor is configured to execute the instructions to receive a first signal from a device via the communications unit. The first signal includes image data that identifies a plurality of individuals, and the individuals are associated with an exchange of data. Based on an analysis of the image data, the at least one processor is further configured to determine a value of a first characteristic associated with each of the individuals and to generate relationship data characterizing a relationship between the individuals. The at least one processor is further configured to determine candidate values of parameters that characterize the data exchange based on portions of the first characteristic values and the relationship data, and to generate and transmit, to the device via the communications unit, a second signal that includes the candidate parameter values. The second signal includes information that causes an application program executed by the device to present at least a portion of the candidate parameter values within a digital interface.

In other examples, a computer-implemented method includes receiving, by at least one processor, a first signal from a device. The first signal includes image data that identifies a plurality of individuals associated with an exchange of data. Based on an analysis of the image data, the method also includes, by the at least one processor, determining a value of a first characteristic associated with each of the individuals and generating relationship data characterizing a relationship between the individuals. The method also includes determining, by the at least one processor, candidate values of parameters that characterize the data exchange based on portions of the first characteristic values and the relationship data, and generating and transmitting, by the at least one processor, a second signal to the device that includes the candidate parameter values. The second signal includes information that causes an application program executed by the device to perform operations that present at least a portion of the candidate parameter values within a digital interface.

Further, in some examples, a device includes a display unit, a communications unit, a storage unit storing instructions, and at least one processor coupled to the display unit, the communications unit, and the storage unit. The at least one processor being configured to execute the instructions to generate and transmit, via the communications unit, a first signal to a computing system. The first signal includes image data that identifies a plurality of individuals associated with an exchange of data. The at least one processor is further configured to receive, via the communications unit, a second signal from the computing system. The second signal includes candidate values of parameters characterizing the data exchange, and the at least one processor is further configured to perform operations that display, using the display unit, the candidate parameter values within a corresponding portion of a digital interface. The first signal includes information that causes the computing system to execute an application program. The executed application program performs operations that, based on an analysis of the image data, determine a value of a characteristic associated with each of the individuals and generate relationship data characterizing a relationship between the individuals, and that determine the candidate parameter values based on portions of the characteristic values and the relationship data.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Figure 1:
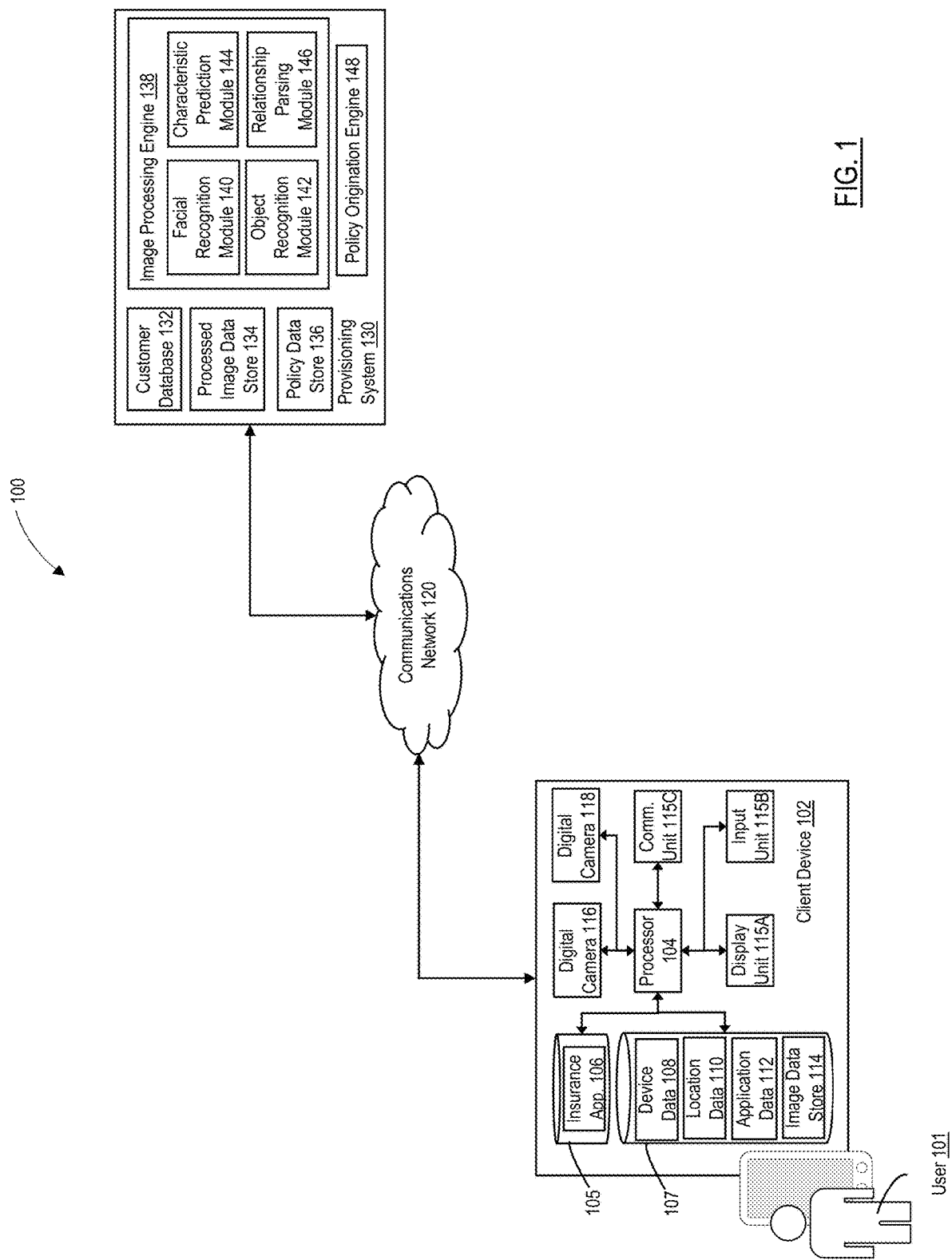
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

I. Exemplary Computing Environments

FIG. 1 is a diagram illustrating an exemplary computing environment 100, consistent with certain disclosed embodiments. As illustrated in FIG. 1, environment 100 may include one or more devices, such as client device 102 operated by user 101, and one or more computing systems, such as provisioning system 130, each of which may be interconnected through any appropriate combination of communications networks, such as network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In an embodiment, client device 102 may include a computing device having one or more tangible, non-transitory memories that store data and/or software instructions, and one or more processors, e.g., processor 104, configured to execute the software instructions. The one or more tangible, non-transitory memories may, in some instances, store software applications, application modules, and other elements of code executable by the one or more processors, e.g., within application repository 105. For example, as illustrated in FIG. 1, client device 102 may maintain, within application repository 105, an insurance application 106 associated with, and provisioned to client device 102 by, provisioning system 130, such as, but not limited to, insurance application 106. As described herein, insurance application 106 may exchange data with provisioning system 130 or other network-connected computing systems operating within environment 100 through one or more secure, programmatic interfaces, such as an application programming interfaces (API), e.g., in support of any of the exemplary processes described herein.

Client device 102 may also establish and maintain, within the one or more tangible, non-tangible memories, one or more structured or unstructured data repositories or databases, e.g., data repository 107, that include device data 108, device location data 110, application data 112, and image data store 114. In some instances, device data 108 may include data that uniquely identifies client device 102, such as a media access control (MAC) address of client device 102 or an IP address assigned to client device 102, and device location data 110 may maintain one or more elements of geographic location information that identifies geographic locations of client device 102 at corresponding times and dates (e.g., a latitude, longitude, or altitude measured by an on-board positioning unit at regular temporal intervals).

Application data 112 may include information that facilitates a performance of operations by the one or more executable application programs maintained within application repository 105, e.g., insurance application 106. For instance, application data 112 may include one or more authentication credentials that enable user 101 to access one or more digital interfaces generated by executed insurance application 106, and examples of the one or more authentication credentials include, but are not limited to, an alphanumeric user name or user name, an alphanumeric password, or a biometric authentication credential (e.g., a digital image of user 101's face, a fingerprint scan, etc.).

Image data store 114 may include digital image data characterizing one or more digital images captured by a digital embedded into, or communicatively coupled to, client device 102. For example, image data store 114 may include digital image data characterizing captured digital image that includes a portion of user 101's face in conjunction with other individuals having a relationship with user 101, e.g., a familial relationship, and additionally, or alternatively, a portion of one or more physical objects, such as a single-family home or a vehicle.

Referring back to FIG. 1, client device may also include a display unit 115A configured to present interface elements to user 101, and an input unit 115B configured to receive input from user 101, e.g., in response to the interface elements presented through display unit 115A. By way of example, display unit 115A may include, but is not limited to, an LCD display unit or other appropriate type of display unit, and input unit 115B may include, but is not limited to, a keypad, keyboard, touchscreen, voice activated control technologies, or appropriate type of input unit. Further, in additional aspects (not depicted in FIG. 1), the functionalities of display unit 115A and input unit 115B may be combined into a single device, e.g., a pressure-sensitive touchscreen display unit that presents interface elements and receives input from user 101. Client device 102 may also include a communications unit 115C, such as a wireless transceiver device, coupled to processor 104 and configured by processor 104 to establish and maintain communications with network 120 using any of the communications protocols described herein.

Further, as illustrated in FIG. 1, client device 102 may also include a digital camera 116 and a positioning unit 118, each of which may be coupled to processor 104. Digital camera 116 may, for instance, include a front-facing digital camera and/or a rear-facing digital camera, and in response to input provided to client device 102, e.g., via input unit 115B, digital camera 116 may be configured by processor 104 to capture image data identifying one or more objects or individuals within a physical environment of client device 102. In some instances, positioning unit 118 may include, but is not limited to, a Global Positioning System (GPS) unit, an assisted GPS (aGPS) unit, or an additional sensor consistent with one or more other positioning systems. Positioning unit 118 may be configured by processor 104 to determine a geographic location of client device 102 (e.g., a latitude, longitude, altitude, etc.) at regular temporal intervals, and to store data indicative of the determined geographic location within a portion of corresponding tangible, non-transitory memory (e.g., within a portion of device location data 110), along with data identifying the temporal interval (e.g., a time and/or date).

Examples of client device 102 may include, but are not limited to, a personal computer, a laptop computer, a tablet computer, a notebook computer, a hand-held computer, a personal digital assistant, a portable navigation device, a mobile phone, a smartphone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on an interface module, consistent with disclosed embodiments. In some instances, user 101 may operate client device 102 and may do so to cause client device 102 to perform one or more operations consistent with the disclosed embodiments.

Referring back to FIG. 1, provisioning system 130 may represent a computing system that includes one or more servers (not depicted in FIG. 1) and tangible, non-transitory memory devices storing executable code and application modules. Further, the servers may each include one or more processor-based computing devices, which may be configured to execute portions of the stored code or application modules to perform operations consistent with the disclosed embodiments.

In other examples, provisioning system 130 may correspond to a distributed system that includes computing components distributed across one or more networks, such as network 120, or other networks, such as those provided or maintained by cloud-service providers, e.g., Google Cloud™, Microsoft Azure™, etc. For instance, and as described herein, the distributed computing components of provisioning system 130 may collectively perform operations that establish an artificial neural network capable of, among other things, adaptively and dynamically processing captured image data to recognize and characterize one or more individuals or objects within the captured image data and further, to characterize a relationship existing between these individuals or objects. The disclosed embodiments are, however, not limited to these exemplary distributed systems, and in other instances, provisioning system 130 may include computing components disposed within any additional or alternate number or type of computing systems or across any appropriate network.

In some instances, provisioning system 130 may be associated with, or operated by, a financial institution, and insurance company, or other business or organizational entity that underwrites or issues one or more insurance policies to, or on behalf of, corresponding customers or beneficiaries, such as user 101 and one or more family members of user 101. Examples of these insurance policies include, but are not limited to, a term life insurance policy, a whole life insurance policy, a health insurance policy (e.g., a medical, dental, and/or vision insurance policy), a homeowner's insurance policy, a vehicle insurance policy, and any additional, or alternate, insurance policy issued to user 101 and listing user 101 or the one or more family members as beneficiaries. Further, and as described herein, provisioning system 130 may also be configured to provision one or more executable application programs to one or more network-connected devices operating within environment 100, such as executable insurance application 106 maintained by client device 102.

To facilitate the performance of any of the exemplary processes described herein, provisioning system 130 may maintain, within one or more tangible, non-transitory memories, a customer database 132, a processed image data store 134, and a policy data store 136. By way of example, customer database 132 may include data records that identify and characterize users of the one or more native application programs associated with, or supported by, provisioning system 130, such as insurance application 106 executed by client device 102. In some instances, the data records of customer database 132 may include, for each user, a corresponding user name (e.g., an alphanumeric login name or user name) and data that uniquely identifies one or more devices associated with or operated by the user (e.g., a unique device identifier, such as an IP address, a MAC address, a mobile telephone number, etc.).

Further, the data records of customer database 132 may also link the user name of each user (and in some instances, the unique device identifier or identifiers) to one or more authentication credentials, which enable corresponding ones of the users to access provisioning system 130 and initiate exchanges of data, such that those that facilitate an issuance of an insurance policy to user 101 (e.g., via client device 102 through a digital portion generated by executed insurance application 106). Examples of these authentication credentials include, but are not limited to, an alphanumeric password, a biometric authentication credential (e.g., a fingerprint scan, a digital image of a user's face, etc.), or any combination thereof.

Customer database 132 may also maintain profile data that characterize each of the users of provisioning system 130. By way of example, the elements of profile data may include, but are not limited to, a full name of each of the users, a mailing address for each of the users, and a value of one or more demographic parameters of each of the users, such as, but not limited to, an age, a gender, an occupation, an educational level, or an income level. Further, in some instances, all or a portion of the profile data for each of the user may be established during an initial registration process (e.g., based on data received from client device 102 via a secure, programmatic interface), and as described herein, the data records of customer database 132 may link the profile data to corresponding user names, unique device identifiers, authentication credentials, and elements of account data.

Referring back to FIG. 1, processed image data store 134 may include data records that associate discrete elements of image data (e.g., which identify user 101, one or more other individuals having a relationship with user 101, and/or one or more objects) with corresponding elements of output data generated based on an application of any of the exemplary facial recognition algorithms or processes, object recognition algorithms or processes, facial analysis algorithms or processes, or relationship analysis algorithms or processes to the discrete elements of image data. By way of example, and for a discrete element of image data obtained from or captured by client device 102 (e.g., via digital camera 116), processed image data store 134 may maintain output data that includes a unique identifier assigned to user 101 and to each of the other individuals included within the discrete element of image data, Further, in some examples, the maintained output data may associate each of the unique identifiers with: (i) positional data characterizing spatial positions of the recognized faces or bodies of user 101 and the other individuals within the image data (e.g., spatial positions bounding regions within the image data that includes corresponding ones of the recognized faces or bodies); and (ii) parameter data specifying the predicted values of the physical or demographic parameters characterizing corresponding ones of user 101 and the other individuals, such as, but not limited to, a predicted age, gender, height or weight, etc.

In further instances, the output data maintained for the discrete element of captured or obtained image data may also include the generated relationship data that defines or characterizes an existence and a structure of a relationship between user 101 and the one or more additional individuals within the captured or obtained image data. For example, the generated relationship data may specify an existence of a familial relationship between user 101 and the one or more additional individuals, may identify a first one of the additional individuals as a spouse or partner of user 101, and may further identify one or more second ones of the additional information as a child of user 101. In some instances, the relationship data may include structured or unstructured data records that associate the unique identifiers of user 101 and the first additional individual with a "partner" or "spouse" attribute, and may associate the unique identifiers of the one or more second additional individuals with a "child" attribute. The disclosed embodiments are, however, not limited to these exemplary relationship of family structures, and in other instances, the relationship data may define any additional or alternate relationship between user 101 and the additional individuals within the discrete element of image data.

Further, and as described herein, one or more of the discrete elements of captured or obtained image data may also include a physical object, such as but not limited to, a single-family home of user 101 or a vehicle operated by user 101, which may be recognized by provisioning system 130 using any of the exemplary processes described herein. For each of these discrete elements of image data, the generated output data may also include a predict object type that characterized the recognized physical object.

In some instances, processed image data store 134 may maintain one or more portion of the generated output data as metadata, which may be appended corresponding ones of the discrete elements of captured or obtained image data. In other instances, provisioning system 130 may maintain the discrete elements of the captured or obtained image data and the corresponding elements of output data within one or more structured or unstructured data records of processed image data store 134, and may link together or associate the discrete elements of the captured or obtained image data and the corresponding elements of output data within the structured or unstructured data records. Further, one or more of the computer vision algorithms or processes, the adaptive statistical algorithms or processes, and the machine learning algorithms or processes, as described herein, may be adapted using, and trained against, portions of processed image data store 134.

Referring back to FIG. 1, policy data store 136 may include structured or unstructured data records that identify one or more insurance policies (e.g., the life, health, homeowner's, or vehicle insurance policies described herein) available to the one or more users of executed insurance application 106, such as, but not limited to, user 101. By way of example, the structure or unstructured data records of policy data store 136 may include, for each of the available insurance policies, a corresponding policy identifier, information characterizing a corresponding policy type (e.g., life, health, homeowner's, vehicle, etc.), and information characterizing an available amount or scope of coverage, an available coverage term, a level of risk associated with the available insurance policy, and data specifying or facilitating a determination of a corresponding premium.

In other examples, policy data store 136 may also include historical policy data characterizing one of more insurance policies previously issued to the one or more users of executed insurance application 106, such as, but not limited to, user 101. For instance, the historical policy data may include, for each of the previously issued insurance policies, a unique identifier of the corresponding user (e.g., a user name or other digital identifier of user 101), data identifying a risk profile or a risk tolerance that characterizes the user, and further, information characterizing an amount or scope of coverage afforded by the previously issued insurance policy, a term of the previously issued insurance policy, and a corresponding premium of the previously issued insurance policy.

In other instances, policy data store 136 may also maintain risk modelling data that facilitates a determination of a risk profile characterizing one or more of the users of executed insurance application 106, such as, but not limited to, user 101. For example, when processed by provisioning system 130, the risk modelling data may enable provisioning system 130 to identify a level of risk, or a tolerance of risk, appropriate to not only the physical and demographic characteristics of user 101 (e.g., an age, gender, income, etc.), but also to a structure and composition of user 101's family (e.g., as specified within the generated relationship data, and by the values of the physical and demographic parameters of the additional individuals within the image data) and to certain objects owned or operated by user 101 (e.g., the object parameter data characterizing a home or residence of user 101 or a vehicle operated by user 101).

Further, as illustrated in FIG. 1, provisioning system 130 may also maintain, within the one or more tangible, non-transitory memories, one or more executable application programs, such as an image processing engine 138 that includes a facial recognition module 140, an object recognition module 142, a characteristic prediction module 144, and a relationship parsing module 146. For example, when executed by provisioning system 130, facial recognition module 140 may apply one or more facial recognition algorithms to portions of image data (e.g., as captured by or obtained from client device 102). Based on an output of the applied facial recognition algorithms or processes, facial recognition module 140 may identify portions of the image data that include a face of user 101 and in some instances, a face of one or more additional individuals having a relationship with user 101.

In some instances, the application of the one or more facial recognition algorithms or processes to the captured or obtained image data may establish bounded regions within the captured image data that include each of the recognized faces, and facial recognition module 140 may perform further operations that assign a unique identifier of to each of the recognized faces and to a corresponding array of spatial positions within the image data that define corresponding ones of the bounded regions. Examples of the one or more facial recognition algorithms or processes include, but are not limited to one or more adaptive or deterministic statistical algorithms (e.g., principal component analysis using eigenfaces, a linear discriminant analysis or an elastic bunch graph matching analysis using a Fisherface algorithm, etc.), one or more computer visional algorithms of processes (e.g., a template matching algorithm, a scale-invariant feature transform (SIFT) algorithm, an adaptive pattern recognition algorithm, a dynamic link matching algorithm based on wavelet transformations, etc.), one or more machine learning algorithms (e.g., an artificial neural network model, a multilinear subspace learning algorithm based on a tensor representation of image data sets, etc.), or one or more artificial intelligence models (e.g., an artificial neural network model, etc.).

Object recognition module 142 may apply one or more object recognition algorithms to portions of image data (e.g., as captured by or obtained from client device 102). Based on an output of these applied object recognition algorithms or processes, object recognition module 142 may identify portions of the image data that include one or more physical objects within the image data and further, may determine values of one or more object parameters that characterize the one or more recognized physical objects, such as, but not limited to, an object type characterizing the recognized physical object. Examples of the one or more object recognition algorithms can include any of the adaptive or deterministic statistical algorithms, the computer visional algorithms or processes, and the machine learning algorithms described herein.

In some instances, when executed by provisioning system 130, characteristic prediction module 144 may apply one or more parameter-specific facial analysis algorithms or processes to the bounded regions of the image data that include, and corresponding to, each of recognized faces (e.g., the recognized face of user 101 and the one or more additional individuals within the image data). Based on the application of the one or more facial analysis algorithms, executed characteristic prediction module 144 may determine values of demographic or physical parameters that characterize each of user 101 and the one or more other individuals, such as, but not limited to, an age, a gender, or a physical height or weight.

Examples of these facial analysis algorithms or processes include, but are not limited to, one or more empirical models that correlate certain features within the recognized faces (e.g., a position of a nose, an eye, an ear, or a hairline, a distance between the eyes, a detected skin tone or hair color, etc.), or certain combinations of the features (e.g., a position of a first one of the features relative to a second one of the features, etc.), with corresponding values of the demographic or physical parameters. In other examples, and consistent with the disclosed embodiments, the facial analysis algorithms can also include one or more deterministic or stochastic statistical algorithms or processes (e.g., a multinomial logistic regression model based on the features or combinations of features described herein), or one or more machine learning algorithms or processes, such as, but not limited to, a decision tree model (e.g., a classification-based model, a regression-based model, an ensemble model, etc.), an association-rule model (e.g., an Apriori algorithm, an Eclat algorithm, or an FP-growth algorithm), or an artificial neural network.

Finally, and upon execution by provisioning system 130, relationship parsing module 146 may further process the determined values of demographic or physical parameters (e.g., as determined by executed characteristic prediction module 144) of user 101 and each of the additional individuals, either alone or in conjunction with portions of the image data, to generate relationship data characterizing an existence or a likely structure of a familial relationship between user 101 and each of the one or more other individuals identified within the image data. For example, executed relationship parsing module 146 may generate all or a portion of the relationship data based on an application of one or more relationship analysis algorithms or processes to the determined values of demographic or physical parameters characterizing each of the user 101 and the additional individuals within the image and additionally, or alternatively, to the bounded region within the image data that include the faces of user 101 and the additional users.

In one instance, the one or more relationship analysis algorithms or processes may include, but is not limited to, a statistical process, such as a multinomial logistic regression model that predicts a structure of a relationship between user 101 and the one or more additional users (e.g., a familial relationship, etc.) based on the determined values of the demographic or physical parameters and additionally, or alternatively, based on additional information derived from the image data (e.g., relative positions of user 101 and the additional individuals within the image data, a detected existence of a contact between user 101 and the additional individuals, etc.). In other instances, the one or more relationship analysis algorithms may include one or more machine learning algorithms that accept as inputs the determined values of the demographic or physical parameters and/or the additional information derived from the image data, such as, but not limited to, a decision tree model, an association-rule model a clustering algorithm, or an artificial neural network.

Additionally, and as illustrated in FIG. 1, the one or more executable application programs may also include a policy origination engine 148 that, when executed by provisioning system 130, identify and characterize one or more available insurance policies that are capable of provisioning to user 101 (e.g., via executed insurance application 106) and further, that are consistent with the generated relationship data, the values of the physical or demographic parameters of user 101 and the additional individuals within the image data and in some instances, the determined values of the object parameters. As described herein, examples of the available insurance policies include, but are not limited to, one or more of the term life, whole health, dental, prescription, or vision insurance policies described herein.

II. Exemplary Computer-Implemented Processes for Dynamically Provisioning Exchanges of Data Based on Processed Image Data In some embodiments, a network-connected computing system, such as provisioning system 130 of FIG. 1, may perform operations that receive digital image data captured by a network-connected device, such as client device 102 of FIG. 1, through a secure, programmatic interface compatible with an application program executed by client device 102, such as an application programming interface (API) compatible with executed insurance application 106 of FIG. 1. As described herein, the elements of captured image data may identify user 101, one or more additional individuals having a familial relationship with user 101, and in some instances, one or more physical objects associated with user 101, such as a residence of user 101 or a vehicle operated by user 101. In some instances, as described herein, provisioning system 130 may perform operations that recognize a face of user 101, a face of each of the additional individuals identifies, and further, the one or more physical objects within corresponding bounded regions of the received image data based on an application of one or more adaptive, machine or computer vision algorithms to the received digital image data.

Provisioning system 130 may perform additional operations that parse the received image data identify, and extract, bounded regions that include the recognized face of user 101 and the recognized face of each of the additional individuals within the received image data (and in some instances, the bounded region that includes all or a portion of the physical object). In further exemplary embodiments, and as described herein, provisioning system 130 may apply one or more parameter-specific facial analysis algorithms to the bounded regions (e.g., bounded "facial" regions within the received image data) that include the face of user 101 and the face of each of the additional individuals within the received image data. Based on the application of the one or more parameter-specific facial analysis algorithms to the bounded facial regions, provisioning system 130 may perform operations that predict a value of one or more physical or demographic parameters that characterize user 101 and each of the additional individuals within the received image data, and examples of these parameters include, but are not limited to, an age of user 101 or the additional individuals, a gender of user 101 or the additional individuals, or a height or weight of user 101 or the additional individuals.

Provisioning system 130 may also perform operations that identify one or more candidate exchanges of data having corresponding parameter values that are consistent with the predicted structure of the relationship between user 101 and the additional individuals (e.g., as specified within the generated relationship data), that are consistent with the predicted values of the physical or demographic parameters that characterize user 101 and the additional individuals (and additionally, or alternatively, with one or more characteristics of a physical object recognized within the image data), and further, that are capable of initiation by client device 102. In some instances, provisioning system 130 may generate output data that identifies one or more of the candidate data exchanges and includes the corresponding parameter values that characterize each of these candidate data exchange.

Provisioning system 130 may perform further operations that provision the generated output data client device 102, e.g., across network 120 via the secure programmatic interface, and as described herein, an application program executed by client device 102, such as insurance application 106, may perform operations that process the received output data and present information identifying each of the candidate data exchanges, and the corresponding parameter values, within portions of a digital interface. The presentation of information and the corresponding parameter values may "populate" the interface automatically and without intervention from user 101, and in some instances, executed insurance application 106 may perform additional operations that request an initiation of a selected one of the candidate data exchanges, e.g., based on the corresponding parameter values, in response to a receipt of an additional input from user 101, e.g., via input unit 115B of client device 102, as described herein.

By way of example, each of the candidate exchanges of data may be associated with an available insurance policy, such as the life, health, homeowner's, or vehicle insurance policies described herein, and may facilitate a purchase of the available insurance policy by user 101. Further, the parameter values that characterize each of the candidate data exchanges may represent discrete elements of policy data that establish, or define, an amount or a scope of coverage, a term of coverage, a level of risk, beneficiary data, and a periodic premium for a corresponding one of the available insurance policies. In some instances, and as described herein, the discrete elements of policy data may be consistent with the predicted structure of the relationship between user 101 and the additional individuals (e.g., as specified within the generated relationship data), the predicted values of the physical or demographic parameters that characterize user 101 and the additional individuals, and additionally, or alternatively, with one or more characteristics of a physical object recognized within the image data.

Certain of the exemplary processes described herein, when performed by provisioning system 130, dynamically predict a structure of a familial relationship between user 101 and one or more additional individuals, and dynamically predict values of demographic or physical parameters that characterize each of user 101 and the additional individuals, based on an adaptive analysis and processing of image data that includes at least a face of user 101 and the one or more additional individuals. Through the performance of these exemplary processes, provisioning system 130 may identify a candidate exchange of data (e.g., that facilitates the issuance of any of the available insurance policies described herein) characterized by parameter values that are consistent with the predicted familial structure and the predicted values of the demographic or physical parameters, and provision data characterizing the candidate data exchange to a correspondence network-connected client device, such as client device 102, which may perform operations that populate a digital interface with portions of the provisioned data automatically and without input from user 101.

In some instances, one or more of these exemplary processes may be implemented by provisioning system 130 in addition to, or as an alternate to, conventional quotation processes, which establish a familial structure and an economic condition of user 101 based on discrete elements of user-inputted data provided by user 101 to client device 102 (e.g., via input unit 115B) in response to successively displayed screens of a corresponding digital interface. By dynamically and automatically establishing the familial structure and the economic condition of user 101 based on adaptively processed image data, and by automatically populating digital interfaces with data charactering available insurance policies that are consistent with the dynamically established familial structure and financial position, certain of these exemplary processes may reduce a number of discrete data-input and screen-navigation operations required of user 101 to obtain identify and request an issuance of a selected one of the available insurance positions. In some instances, certain of the exemplary processes described herein can increase a speed, efficiency, and ability of user 101 to interact with the digital interface presented by one or more network-connected devices, especially for those devices characterized by limited display or input functionalities, such as smart watches, wearable devices, or wearable form factors.

Further, one or more of these exemplary processes enable provisioning system 130 to generate and locally maintain elements of policy data defining each of the available insurance policies, to pre-populate digital interfaces with corresponding elements of the generated policy data, and to provision information to client device 102 that establish a deep link to each of the pre-populated digital interfaces. When implemented in addition to, as an alternate to, the conventional quotation processes described herein, certain of these exemplary processes may enable client device 102 to request an issuance of a selected one of the available insurance policies based on a single provided user input (e.g., via input unit 115B), and may enable provisioning system 130 to perform operations that initiate the issuance of the selected insurance policy based not on multiple interaction with client device 102, but based on the locally maintained and deep-linked policy data defining the selected insurance policy. These exemplary further processes further enhance an ability of user 101 to interact within a digital interface presented by a network-connected device. especially for a device characterized by a reduced display or input functionality.

For example, a user of provisioning system 130, such as user 101 of FIG. 1, may elect to obtain information identifying one or more insurance policies available from a financial institution or an insurance company that operates provisioning system 130. In some instances, to obtain the desired information, user 101 may provide input to input to client device 102, via input unit 115B, that triggers an execution of insurance application 106 (e.g., by establishing contact between a finger and a portion of a surface of a pressure-sensitive, touchscreen display unit that corresponds to an icon representative of insurance application 106). Upon execution of insurance application 106, client device 102 may perform operations that generate and display, on display unit 115A, one or more interface elements that prompt user 101 to provide additional input specifying a user name and one or more authentication credentials. As described herein, the user name may include an alphanumeric user name or login name, the authentication credentials may include an alphanumeric password, a biometric authentication credential (e.g., an image of user 101's face or a scan of a fingerprint of user 101), or a combination thereof.

Responsive to the generated and displayed interface elements, user 101 may provide the additional input specifying the user name and the one or more authentication credentials to client device 102, e.g., via input unit 115B. Client device 102 may perform operations that authenticate an identity of user 101 based on locally maintained data specifying the login and authentication credentials (e.g., within application data 112 of data repository 107) and additionally, or alternatively, based on data exchanged across network 120 with provisioning system 130, e.g., via a secure programmatic interface. Further, and based on a successful authentication of the identity of user 101, client device 102 may perform additional operations that generate and display, on display unit 115A, one or more additional interface elements (e.g., collectively establishing a digital interface associated with executed insurance application 106) that prompt user 101 to request information associated with one or more available insurance policies based on, and consistent with, digital image data locally maintained by client device 102, e.g., within image data store 114 of data repository. and additionally, or alternatively, captured by digital camera 116.

As described herein, the digital interface may facilitate a selection, by user 101, of a locally maintained digital image that includes user 101, one or more additional individuals (e.g., a spouse of user 101, a partner of user 101, or one or more children of user 101), and in some instances, one or more physical objects associated with user 101 (e.g., a single-family home, etc.). In some instances, executed insurance application 106 may package the selected digital image into a corresponding request (e.g., alone or in combination within additional information, such as positional data characterizing a current geographic position of client device 102) for transmission across network 120 to provisioning system 130, e.g., via a secure programmatic interface.

Figure 2A:
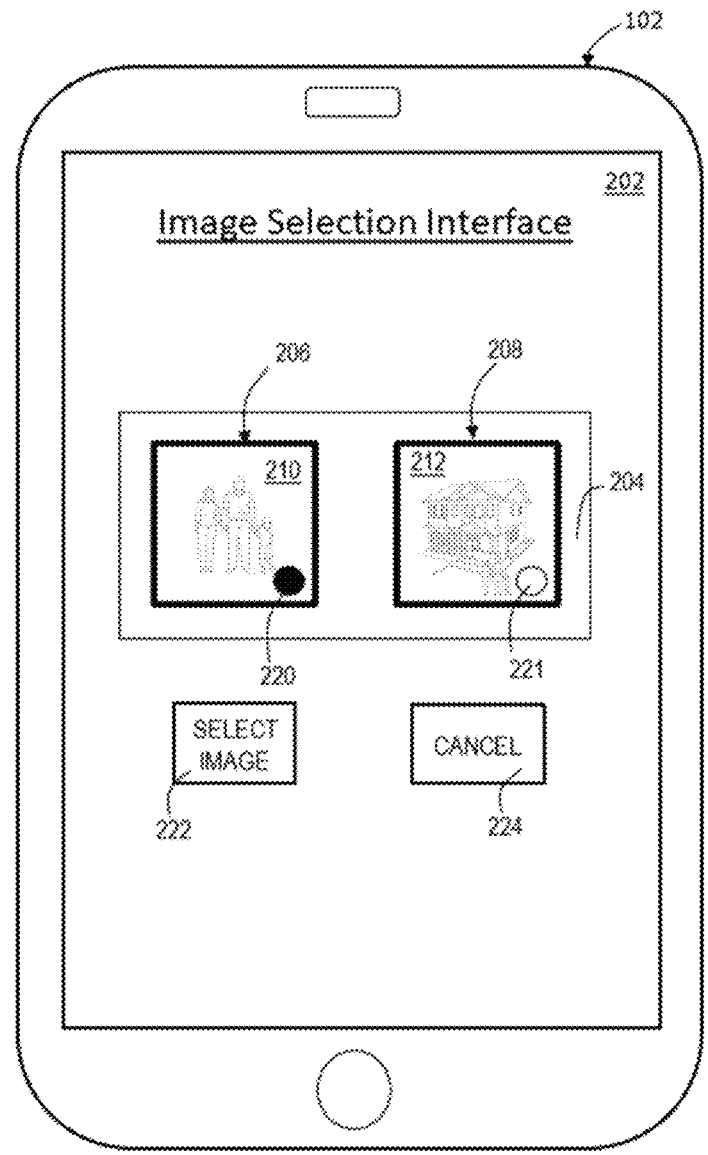
FIG. 2A is a diagram illustrating portions of an exemplary graphical user interface, consistent with the disclosed embodiments.

For example, as illustrated in FIG. 2A, client device 102 may, upon execution of insurance application 106, generate and display an image selection interface 202 on display unit 115A. In some instances, executed insurance application 106 may perform operations that access image data store 114 (e.g., as maintained within data repository 107), and extract locally maintained digital image data associated with one or more digital images captured by digital camera 116. Executed insurance application 106 may further process portions of the digital image data to generate additional interface elements representative of the one or more digital images, which may be displayed within a corresponding portion of image selection interface 202, e.g., within image presentation window 204. For instance, as illustrated in FIG. 2A, image selection interface 202 may include, within image presentation window 204, interface element 206 and 208, which present respective ones of captured digital images 210 and 212 to user 101, e.g., via display unit 115A. Further, each of interface elements 206 and 208 may include a respective one or image selection regions 220 and 221, as described below.

Figure 2B:
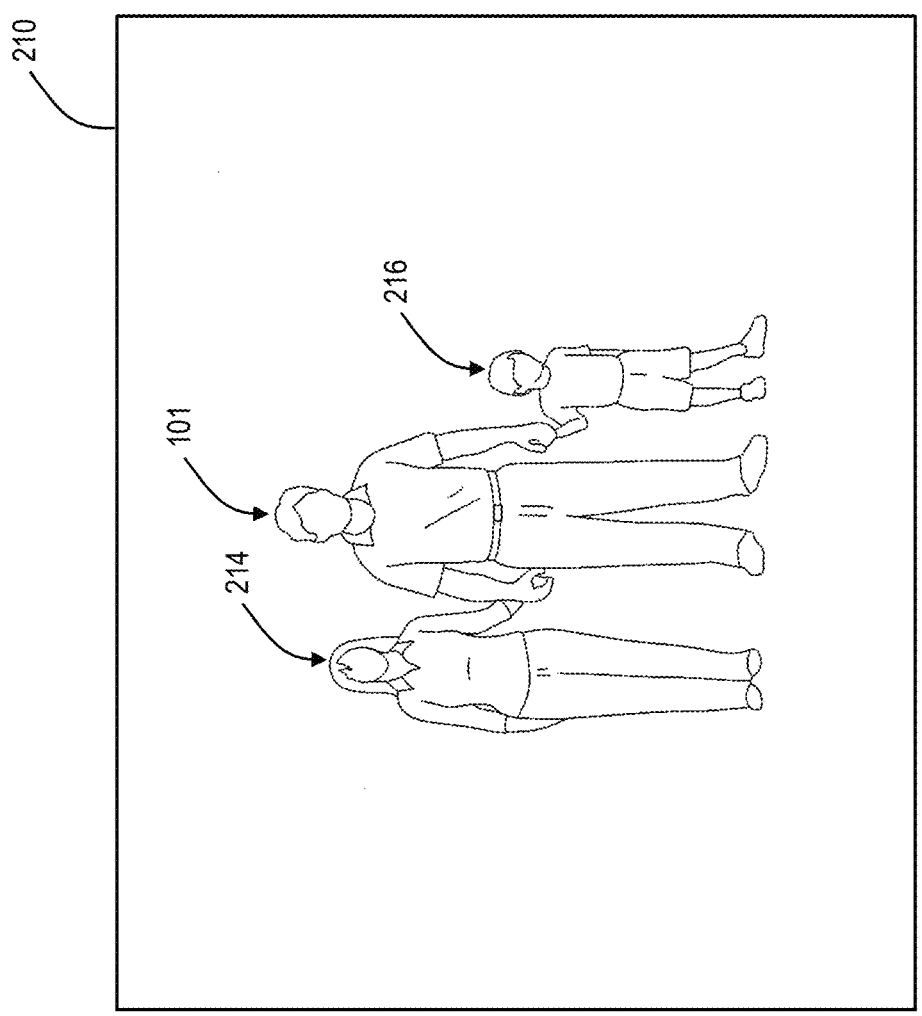
FIGS. 2B and 2C are diagrams illustrating portions of an exemplary digital image, consistent with the disclosed embodiments.
Figure 2C:
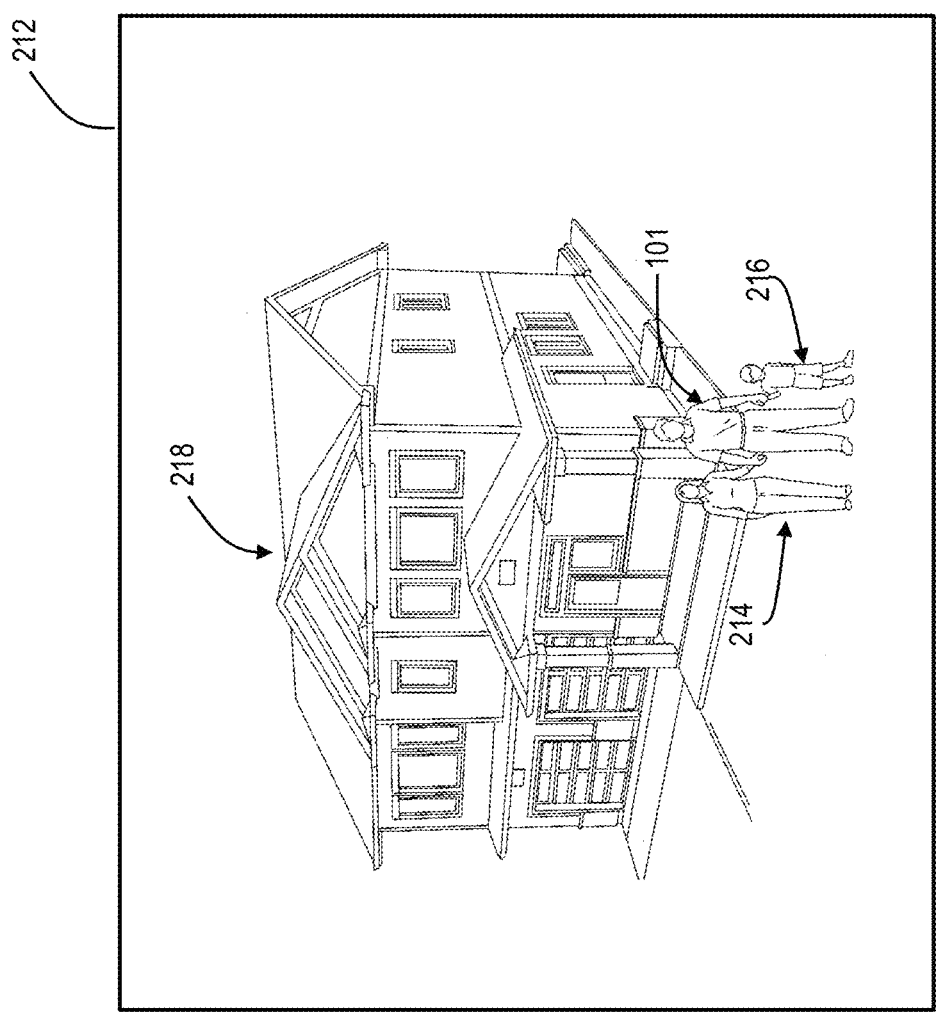

By way of example, as illustrated in FIG. 2B, captured image 210 may include user 101 and one or more additional individuals, such as individual 214 (e.g., a spouse or partner of user 101) and individual 216 (e.g., a child of user 101 and/or individual 214). Further, and in reference to FIG. 2C, captured image 210 may include user 101 and individuals 214 and 216, along with a physical object 218 associated with user 101, such as, but not limited to, a single-family home in which user 101, individual 214, and individual 216 reside. The disclosed embodiments are, however, not limited to image-selection interfaces that include interface elements presenting images 210 and 212, and in other instances, executed insurance application 106 may generate interface elements representative of any additional, or alternate, digital images maintained within image data store 114, along with other interface elements (e.g., scroll bars, etc.) that enable user 101 to provide additional input (e.g., via input unit 115B of client device 102) that scrolls through the generated interface elements presented through image presentation window 204.

Referring back to FIG. 2A, user 101 may provide input to client device 102 that selects a corresponding image selection region 220 displayed within interface element 206, e.g., by establishing contact between a portion of a finger of stylus and a corresponding portion of a surface of touchscreen display unit 115A that corresponds to image selection region 220. In some instances, the user 101 may provide additional input to client device 102 that selects confirmation icon 222 of image selection interface 202 (e.g., using any of the exemplary processes described herein), which confirms user 101's section of digital image 210 for transmission to provisioning system 130. In other instances, user 101 may elect to cancel the image selection process by performing any of the exemplary processes described herein to select a cancellation icon 224 of image selection interface 202.

Figure 3A:
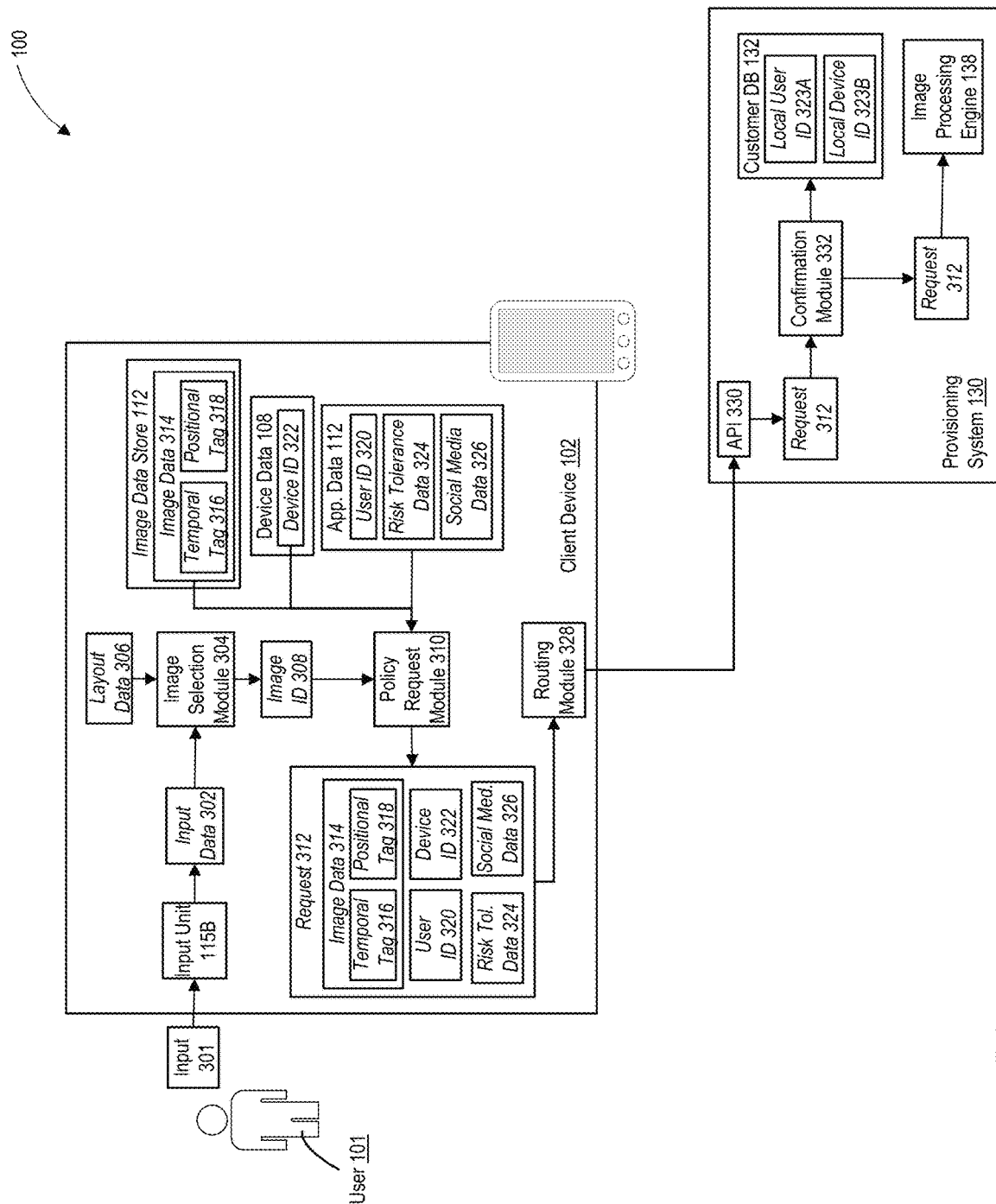
FIGS. 3A and 3B are diagrams illustrating portions of an exemplary computing environment, consistent with the disclosed embodiments.

Referring to FIG. 3A, input unit 115B of client device 102 may detect an input 301 provided by user 101, which selects the corresponding image selection region 220 displayed within interface element 206 and the confirmation icon 222 of FIG. 2D, and may route input data 302 to an image selection module 304 of executed insurance application 106. In some instances, as described the functionalities of display unit 115A and input unit 115B may be combined into a single device, e.g., a pressure-sensitive touchscreen display unit, and input data 302 may identify a spatial position along a surface of the pressure-sensitive touchscreen display unit (e.g., a "contact position") that corresponds to the established contact between the portion of the finger or stylus of user 101 and the surface, e.g., which selected image selection region 220 and the confirmation icon 222.

Image selection module 304 may receive input data 302, and may perform operations that access application data 112 (e.g., as maintained within data repository 107) and extract layout data 306. For example, layout data 306 may identify each of the interface elements rendered for presentation within image selection interface 202 (e.g., interface element 206, confirmation icon 222, etc.), and may include positional information that characterizes spatial positions of each of the interface elements within image selection interface 202 and that maps those spatial positions to corresponding positions along the surface of touchscreen display unit 115A (such as, but not limited to, a positional boundary that encloses one, or more, of the interface elements). Further, and for one or more of the presented interface elements associated with a digital image (e.g., image selection region 220 and/or the confirmation icon 222 associated with digital image 210), corresponding portions of extracted layout data may also include a unique identifier of that digital image and information specifying a local storage location of that digital image (e.g., a pointer to a location within image data store 114, a universal resource locator (URL) of an remote data repository, etc.).

In some instances, image selection module 304 may perform operations that obtain the contact position specified within input data 302, and based on a comparison between the contact position and the positional information specified for each of the presented interface elements within layout data 306, image selection module 304 may establish that input 301 represents a selection of confirmation icon 222 by user 101 and as such, a selection of digital image 210. Image selection module 304 can also parse a portion of layout data 306 that identifies and characterizes selected confirmation icon 222, and extract a unique image identifier 308 of selected digital image 210 from that identified portion. As illustrated in FIG. 3A, image selection module 304 may provide image identifier 308 as an input to a policy request module 310 of executed insurance application 106, which may perform any of the exemplary processes described herein to package selected digital image 210 into a portion of a request 312 for data identifying and charactering one or more insurance policies that are available to user 101 and further, that are consistent with the individuals or objects identified within selected digital image 210.

As illustrated in FIG. 3A, policy request module 310 may receive image identifier 308 of selected digital image 210, and may perform operations that access image data store 114 (e.g., a maintained within data repository 107), which maintains elements of digital image data that captured by digital camera 116 and/or received by client device 102 across network 120 from one or more third parties. In some instances, policy request module 310 may parse the accessed elements of digital image data to identify a corresponding one of the elements of digital image data, e.g., image data 314, that includes, references, or is linked to image identifier 308 and as such, represents selected digital image 210. Policy request module 310 may extract image data 314 from image data store 114, and package extracted image data 314 within a corresponding portion of request 312

In some examples, digital camera 116 can perform operations that tag digital image 210 with a time or date at which digital camera 116 captured digital image 210 and additionally, or alternatively, with a geographic position of client device 102 at that time or data, e.g., as detected by positional unit 118. For instance, and as illustrated in FIG. 3A, image data 314 can include embedded temporal tag 316, which specifies the time or date at which digital camera 116 captured digital image 210, and additionally, or alternatively, positional tag 318, which specifies the geographic position of client device 102 at that time or date.

In other instances, not illustrated in FIG. 3A, digital camera 116 can perform operations that tag digital image 210 with only a time or date of capture (e.g., as specified within temporal tag 316). Based on a detection of temporal tag 316 within image data 314, and an absence of positional tag 318, policy request module 310 can access device location data 110 (e.g., as maintained within data repository 107), and obtain positional data that characterizes a geographic position of client device 102 at the time or date specified within temporal tag 316, or at an additional time or date that falls within a threshold period of the time of date specified within temporal tag 316. Policy request module 310 can perform operations that package the obtained positional data within positional tag 318. Additionally, or alternatively, image data 314 may include neither temporal tag 316 nor positional tag 318, and policy request module 310 can perform operations that package a time or date at which user 101 selected digital image 210 into a corresponding portion of temporal tag 316, and that package a geographic position of client device 102 at the time or date of selection (e.g., as detected by positional unit 118) into positional tag 318.

Referring back to FIG. 3A, policy request module 310 may perform operations that package image data 314, along with temporal tag 316 and positional tag 318, into a corresponding portion of request 312. In some instances, policy request module 310 may also package a unique user identifier 320 of user 101 (e.g., as maintained within application data 112 of data repository 107) and a unique device identifier of client device 102 (e.g., as maintained within device data 108 of data repository 107) into request 312. By way of example, user identifier 320 can include, but is not limited to, an alphanumeric user name of user 101, an alphanumeric password of user 101, a biometric credential (e.g., a fingerprint scan, facial, image, etc.), or a digital identifier (e.g., a cryptogram, hash value, etc.) that facilitates user 101's access to executed insurance application 106, and device identifier 322 can include, but is not limited to, an IP address, a MAC address, or a mobile telephone number assigned to client device 102.

In some examples, policy request module 310 may perform additional operations that access (or generate) and package data 324 within request 312 that characterizes a tolerance of user 101 to insurance or financial risk and additionally, or alternatively, provisioning system 130 to determine the tolerance of user 101 to that insurance or financial risk. For instance, the tolerance of user 101 to financial or insurance may be dependent on factors that include, but are not limited to, an age of user 101, a financial position of user 101 (e.g., an annual salary, an amount of savings, an amount of secured or unsecured debt, an ownership of real estate or a mortgage imposed on that real estate, etc.), a marital or familial structure of user 101, or a future plan or goal of user 101 (e.g., an expectation to fund a child's education, etc.). Further, a selection of candidate insurance policies available to user 101 by provisioning system 130, e.g., using any of the exemplary processes described herein, may depend in part on a consistency between parameters that characterize each of these policies (e.g., policy type, term, premiums, coverage, etc.) and the risk tolerance of user 101.

In one instance, policy request module 310 may access application data 112, extract risk tolerance data 324, which characterizes or establishes a risk profile of user 101, and package extracted risk tolerance data 324 into a corresponding portion of request 312. For example, risk tolerance data 324 may include a value (e.g., ranging from zero to unity) indicative of user 101's aversion to risk (e.g., a value of zero) or acceptable of risk (e.g., a value of unity), and executed insurance application 106 can perform operations that compute the value based on input provided by user 101 during an initial registration process and store the computed value within application data 112. In other examples, risk tolerance data 324 may include elements of demographic data that characterize user 101 (e.g., an age, gender, etc.), a financial position of user 101 (e.g., an annual salary, amounts of savings or debt, a credit rating, etc.), or marital or familial status, and user 101 may provide elements of the demographic data to executed insurance application 106 (e.g., as input, via input unit 115B, to one or more digital interfaces generated by executed insurance application 106 and presented via display unit 115A). The disclosed embodiments are, however, not limited to, these examples of risk tolerance data 324, and in other instances, policy request module 310 may package into request 312 any additional, or alternate, elements of risk tolerance data 324 the facilitates a determination of user 101's risk profile by provisioning system 130.

In other instances, and in addition to, or as an alternate to risk tolerance data 324, policy request module 310 may perform operations that package, into request 312, social media data 326 identifying and characterizing an interaction of user 101 with one or more social networking platforms, such as, but not limited to, Facebook™ Instagram™, LinkedIn™, or Snapchat™. For example, social media data 326 may include information that identifies user 101 within each of the one or more social networking platforms (e.g., a user name or a handle, etc.) and may also include information identifying one or more individuals to which user 101 is connected through the one or more social networks. In some instances, as described herein, provisioning system 130 may perform operations that processes portions of social media data 326 and determine the insurance risk tolerance, and the risk profile, of user 101 based on similar tolerances and profiles for other customers of provisioning system 130 linked to user 101 within the cone or more social networks.

Referring back to FIG. 3A, policy request module 310 may provide request 312, which includes image data 314, temporal tag 316, positional tag 318, user identifier 320, and device identifier 322 (and in some instances, risk tolerance data 324 and/or social media data 326), as an input to a routing module 328 of client device 102. Routing module 328 may perform operations that identify a unique network address of provisioning system 130 (e.g., an assigned IP address), and that cause client device 102 to transmit request 312 across network 120 to provisioning system 130, e.g., via a secure, programmatic interface. In some instances, provisioning system 130 may receive request 312, and perform any of the exemplary processes described herein to determine, dynamically and adaptively, a structure of a family of user 101 based on portions of image data 314, and to obtain data identifying one or more insurance policies that are available to user 101 and that are characterized by parameters consistent with the determined family structure and the risk tolerance of user 101.

A secure programmatic interface of provisioning system 130, e.g., application programming interface (API) 330, may receive request 312, which includes image data 314, temporal tag 316, positional tag 318, user identifier 320, and device identifier 322 (and in some instances, risk tolerance data 324 and/or social media data 326), and may route request 312 to a confirmation module 332 of provisioning system 130. API 330 may be associated with or established by confirmation module 332, and may facilitate secure, module-to-module communications across network 120 between confirmation module 332 and routing module 328 of client device 102. In some examples, confirmation module 332 may parse request 312 to extract device identifier 322 (an in some instances, user identifier 320), and may perform operations that compare extracted device identifier 322 (and in some instances, user identifier 320) against corresponding elements of locally maintained device identifier 332B or user identifier 332A. Based on an outcome of the comparison, confirmation module 332 may determine whether client device 102 (and in some instances, user 101) is permissioned to access provisioning system 130 via API 330.

If, for example, confirmation module 332 were to detect an inconsistency between extracted and local copies of the device or user identifiers, confirmation module 332 may determine that client device 102 lacks permission to access provisioning system 130 via API 330. In response to the determined lack of permission, confirmation module 332 may discard request 312, e.g., as received from client device 102, and provisioning system 130 may perform additional operations that generate and transmit, to client device 102 across network 120, message data that indicating that client device 102, and executed insurance application 106, lack permission to access provisioning system 130 via API 330 (not illustrated in FIG. 3A).

Alternatively, if confirmation module 332 were to establish a consistency between the extracted and local copies of the device or user identifiers, confirmation module 332 can perform operations that store all or a portion of request 312, including image data 314, temporal tag 316, and positional tag 318 (and in some instances, risk tolerance data 324 and social media data 326) within a corresponding, and temporary location, within a locally tangible, non-transitory memory. Further, confirmation module 332 may also perform operations that store image data 314, either alone or in conjunction with temporal tag 316 and/or positional tag 318, within a portion of processed image data store 134 (e.g., for subsequent training and improvement any of the dynamic or adaptive algorithms described herein). In some instances, confirmation module 332 may perform operations that store captured image data 314 within the one or more tangible, non-transitory memories (e.g., within a portion of processed image database 154). Further, confirmation module 332 may provide all or a portion of request 312 as an input to image processing engine 138, which may perform any of the exemplary processes described herein to recognize a face of user 101 and any additional individual within image data 314, and based on image data 314, to predict values of demographic parameters that characterize each of the additional individuals and to predict an existence and a structure of a familial relationship between user 101 and each of the additional individuals within image data 314.

Figure 3B:
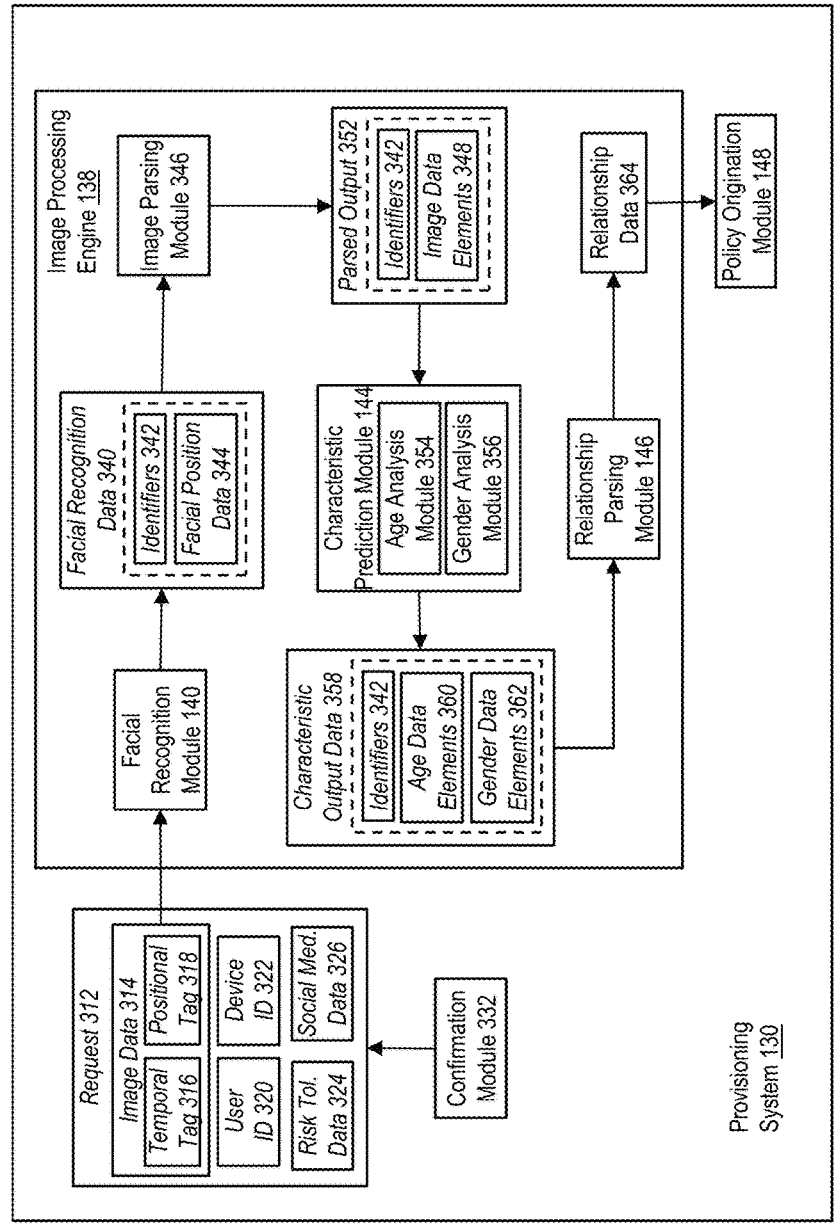

Referring to FIG. 3B, image processing engine 138 of provisioning system 130 may receive image data 314 from confirmation module 332, and facial recognition module 140 may apply any of the exemplary facial recognition algorithms or processes to image data 314. By way of example, and as described herein, examples of these facial recognition algorithms or processes can include, but are not limited to an adaptive or deterministic statistical algorithm (e.g., principal component analysis using eigenfaces, a linear discriminant analysis, or an elastic bunch graph matching analysis using a Fisherface algorithm, etc.), a computer visional algorithm (e.g., a template matching algorithm, a scale-invariant feature transform (SIFT) algorithm, an adaptive pattern recognition algorithm, a dynamic link matching algorithm based on wavelet transformations, etc.), or a machine learning algorithm (e.g., an artificial neural network model, a multi-linear subspace learning algorithm based on a tensor representation of image data sets, etc.).

Figure 3C:
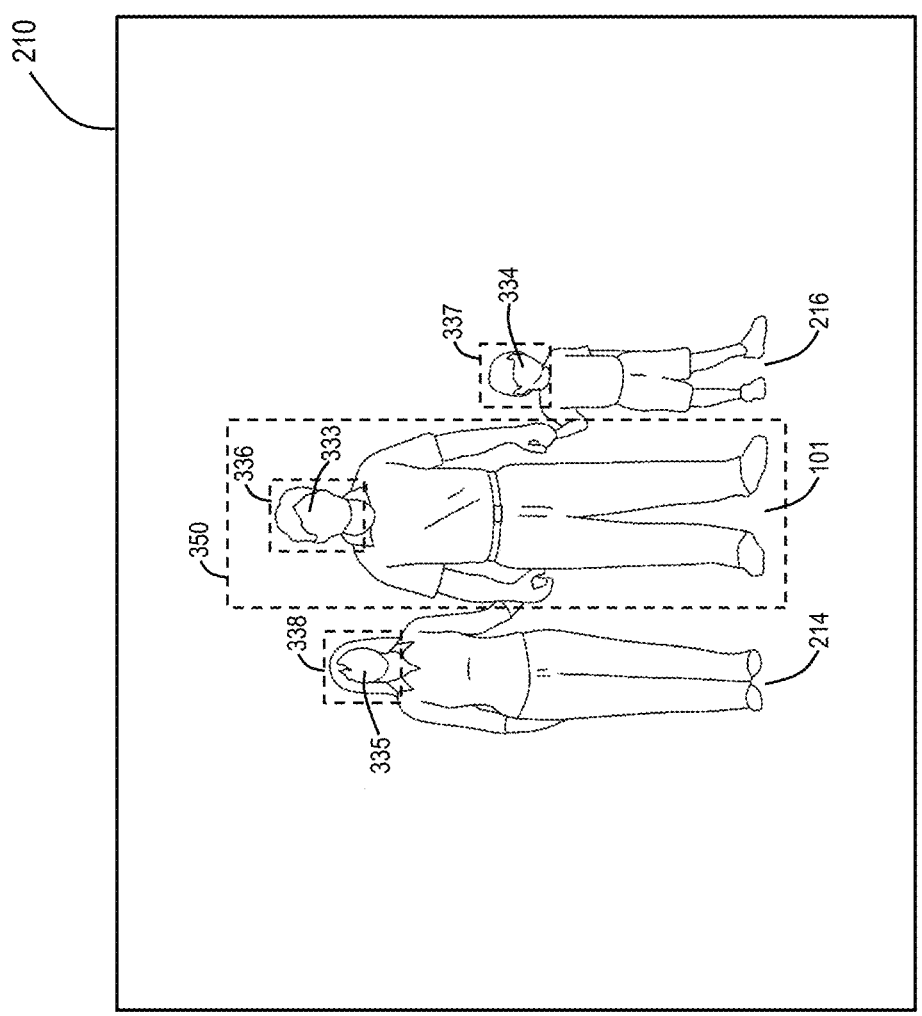
FIG. 3C is a diagram illustrating elements of processed image data, consistent with the disclosed embodiments.

Based on the application of one, or more, of these exemplary facial recognition algorithms to image data 314, facial recognition module 140 may perform operations that identify a face of user 101 and of each additional individual identified within digital image 210. For example, as illustrated in FIG. 3C, facial recognition module 140 may recognize a face 333 of user 101, along with faces 334 and 335 of two additional individuals identified within digital image 210.

Further, and based on the application of any of the exemplary facial recognition algorithms or processes described herein to image data 314, facial recognition module 140 may also determine spatial positions that characterize each of recognized faces 333, 334, and 335 within digital image 210. In one example, the determined spatial positions may define bounded regions within digital image 210 that include the faces recognized within digital image 210, e.g., faces 333, 334, and 335. For instance, as illustrated in FIG. 3C, facial recognition module 140 may determine spatial positions that define, within digital image 210, a bounded region 336 within that includes recognized face 333 of user 101, a bounded region 337 that includes recognized face 334, and a bounded region 338 that includes recognized face 335.

The disclosed embodiments are, however, not limited to facial recognition processes that define bounded regions within digital image 210 that include each of the recognized faces. For instances, facial recognition module 140 may also compute a centroid of each of recognized faces 333, 334, and 335 (not illustrated in FIG. 3C), and determine a spatial position of each of the computed centroids within digital image 210. In other instances, and based on the application of any of the exemplary facial recognition algorithms or processes described herein to image data 314, facial recognition module 140 may also recognize discrete facial features associated with each of recognized faces 333, 334, and 335 (also not illustrated in FIG. 3C). Examples of these recognized facial features include, but are not limited to, an eye, an ear, a nose, a mouth, a chin, a brow line, or a hairline, and facial recognition module 140 may determine spatial positions of these recognized facial features within digital image 210, and may further compute displacements between the spatial positions of certain pairs of features within one or more of recognized faces 333, 334, and 335 (e.g., a distance separating user 101's eyes, a distance between a nose and a mouth of user 101, etc.).

In some instances, facial recognition module 140 may assign a unique identifier to each of the recognized faces and to corresponding portions of the determined spatial positions, and as illustrated FIG. 3B, facial recognition module 140 may output facial recognition data 340 that includes and links the assigned identifiers, e.g., identifiers 342, to the corresponding portions of the spatial positions, e.g., facial position data 344. Further, facial recognition module 140 may also perform operations that store identifiers 342 and facial position data 344 within a corresponding portion of processed image data store 134, and that that link identifiers 342 and facial position data 344 to image data 314. Facial recognition module 140 may further provide facial recognition data 340 as an input to an image parsing module 346 of image processing engine 138.

Image parsing module 346 may receive facial recognition data 340, e.g., from facial recognition module 140, and may further access image data 314, e.g., as received from facial recognition module 140 or as maintained within processes image data store 134. As described herein, facial recognition data 340 may include, among other things, unique identifiers 342 assigned to each of the faces recognized in digital image 210 (e.g., recognized faces 333, 334, and 335 of FIG. 3C) and facial position data 344 associated with each of the recognized faces (e.g., spatial positions that establish bounded regions 336, 337, and 338 of FIG. 3C). In some instances, using facial position data 344, image parsing module 346 may parse image data 314 to identify portions of image data 314 that include at least the recognized face of each individual within digital image 210 (e.g., recognized faces 333, 334, and 335 of user 101 and individuals 214 and 216 of FIG. 3C), and decompose image data 314 as discrete elements 348 of image data associated with the corresponding ones of user 101 and individuals 214 and 216.

By way of example, as illustrated in FIG. 3C, image parsing module 346 may process image data 314 in conjunction with identifiers 342 and facial position data 344 to identify a portion of image data 314 that correspond to bounded region 336, e.g., that includes recognized face 333 of user 101. In one instance, image parsing module 346 may extract that portion of image data 314, which corresponds to bounded region 336, and package the extracted portion into a corresponding one of image data elements 348, e.g., associated with user 101. In other instances, image parsing module 346 may identify additional an additional portion of image data 314 that include recognized face 333 and additional portions of user 101's body. For example, as illustrated in FIG. 3C, image parsing module 346 may perform operations that package, into the corresponding one of image data elements 348, the additional portion of image data 314 that corresponds to expanded region 350 of digital image 210, which includes not only user 101's recognized face, but the entirety of user 101's body.

The disclosed embodiments are, however, not limited to discrete image files that include either user 101's face or user 101's entire body, and in other instances, image parsing module 346 can perform any of exemplary processes described herein to package, into the corresponding one of image data elements 348, portions of image data 314 that include user 101's face in conjunction with any additional, or alternate, part of user 101's body. Further, although not illustrated in FIG. 3C, image parsing module 346 may perform any of the exemplary processes described herein to generate a corresponding one of image data elements 348 for each additional, or alternate, individual within digital image 210, such as, but not limited to, individuals 214 and 216.

Referring back to FIG. 3B, image parsing module 346 may perform operations that associate each of image data elements 348 with a corresponding one of identifiers 342 (e.g., to associate each of image data elements 348 with a corresponding one of user 101 and individuals 214 and 216), and generate parsed image data 352 that includes image data elements 348 and associated identifiers 342. Further, although not illustrated in FIG. 3B, image parsing module 346 may also perform operations that store image data elements 348 within a corresponding portion of processed image data store 134, and associate stored image data elements 348 within image data 314, identifiers 342, and facial position data 344. As illustrated in FIG. 3B, image parsing module 346 may provide parsed image data 352 as an input to characteristic prediction module 144 of image processing engine 138, which may perform any of the exemplary processes described herein to analyze each of image data elements 348, either alone or in conjunction with additional portions of image data 314 and facial position data 344, to predict values of physical or demographic parameters that characterize each of the individuals within digital image 210, such as user 101 and individual 214 and 216.

In some instances, characteristic prediction module 144 may include one or more parameter-specific analytical modules, each of which may be configured, upon execution, to analyze each of image data elements 348 to predict a corresponding parameter value that characterizes each of user 101, individual 214, and individual 216 within digital image 210. For example, illustrated in FIG. 3B, characteristic prediction module 144 may include an age analysis module 354, which may be configured to perform any of the exemplary processes described herein to predict an age of user 101 and individuals 214 and 216 based on corresponding ones of image data elements 348, and a gender analysis module 356, which may be configured to perform any of the exemplary processes described herein to predict a gender of each of user 101 and individuals 214 and 216 based on corresponding ones of image data elements 348. The disclosed embodiments are, however, not limited to age- and gender-specific analytical modules and in other instances, characteristic prediction module 144 may include any additional or alternate parameter-specific analytical modules, such as that predict a height or a weight, and any additional or alternate executable modules that support the operations performed by the parameter-specific analytical modules.

In one example, age analysis module 354 or gender analysis module 356 (or other ones of the application-specific analytical modules of characteristic analysis module 144) may include an analytical or empirical model (e.g., a deterministic statistical process) that correlates a position of one or more facial features within a human face, or a spatial characteristic of that human face, to a corresponding age, gender, or other physical or demographic parameter of user 101, individual 214, or individual 216. For instance, the analytical or empirical model may correlate certain model input data, such as, but not limited to, spatial dimension of a human face (e.g., longitudinal dimension defined by a distance between a chin and a hairline, a transverse dimension characterized by a distance separating each ear, etc.) or a spatial position or disposition of one or more facial features relative to other facial features within the human face (e.g., a distance separating left and right eyes in a transverse direction, distances separating the left and right eyes, a nose, and a mouth in a longitudinal direction, etc.). to a corresponding age or range of ages, and additionally, or alternatively, to a corresponding gender. In other instances, the analytical or empirical model may correlate additional model input data, such as a detected presence of certain facial features within the human face (e.g., a beard, a moustache, etc.) or a characteristic of certain detected facial features (e.g., a detected skin tone, a detected hair color, etc.), to a corresponding age or range of ages, and additionally, or alternatively, to a corresponding gender.

In other examples, one or more of age analysis module 354 or gender analysis module 356 (or other ones of the application-specific analytical modules of characteristic analysis module 144) may apply one or more stochastic statistical processes, machine learning algorithms, or artificial intelligence models to each of image data elements 348 (e.g., portions of image data 314 that include corresponding ones of recognized faces 333, 334, and 335), to raw or processed portions of facial position data 344 that characterize the digital image data within each of image data elements 348, and additionally, or alternatively, to each of image data elements 348 in conjunction with the raw or processed portions of facial position data 344. For instance, and to predict an age (or range of ages) or a gender of user 101, individual 214, or individual 216 (or other individuals within digital image 210), age analysis module 354 or gender analysis module 356 may perform operations that: (i) process portions of facial position data 344 to generate elements of model input data associated with corresponding ones of user 101, individual 214, or individual 216 and as such, corresponding ones of image data elements 348; and (ii) apply the stochastic statistical processes, machine learning algorithms, or artificial intelligence models to the model input data to predict respective ones of the age (or the age range) or gender of each of user 101, individual 214, or individual 216 (or other individuals within digital image 210).

Additionally, in some instances, age analysis module 354 or gender analysis module 356 may predict the age (or the age range) or gender of user 101, individual 214, or individual 216 (or other individuals within digital image 210), based on an application of the one or more stochastic statistical processes, machine learning algorithms, or artificial intelligence to each of image data elements 348 and further, to corresponding portions of the model input described herein. In other instances, age analysis module 354 or gender analysis module 356 may predict respective ones of the age (or the age range) or gender of each of user 101, individual 214, or individual 216 (or other individuals within digital image 210) based on an application of the one or more stochastic statistical processes, machine learning algorithms, or artificial intelligence described herein to each of image data elements 348, e.g., alone and without additional model input data.

Examples of the stochastic statistical processes can include, among other things, a support vector machine (SVM) model, a multiple regression algorithm, a least absolute selection shrinkage operator (LASSO) regression algorithm, or a multinomial logistic regression algorithm, and examples of the machine learning processes can include, but are not limited to, an association-rule algorithm (such as an Apriori algorithm, an Eclat algorithm, or an FP-growth algorithm) or a clustering algorithm (such as a hierarchical clustering process, a k-means algorithm, or other statistical clustering algorithms). Further, examples of the artificial intelligence models include, but are not limited to, an artificial neural network model, a recurrent neural network model, a Bayesian network model, or a Markov model. In some instances, these stochastic statistical processes, machine learning algorithms, or artificial intelligence models can be trained against, and adaptively improved using, training data having a specified composition, which may be extracted from portion of processing image data store 134 along with corresponding outcome data (e.g., specifying the age, range of ages, gender, etc.), and can be deemed successfully trained and ready for deployment when a model accuracy (e.g., as established based on a comparison with the outcome data), exceeds a threshold value.

Referring back to FIG. 3B, characteristic prediction module 144 can generate characteristic output data 358 that includes the parameter values predicted for each of the individuals within digital image 210, such as, but not limited to, the predicted ages and genders of user 101, individual 214, and individual 216, and that associate each of the predicted parameter values with a corresponding one of identifiers 342, e.g., that uniquely identify user 101, individual 214, and individual 216. In some instances, characteristic output data 358 can correspond to one or more elements of structured data that include data elements 360, which specify the predicted ages of user 101, individual 214, and individual 216, and data elements 362, which specify the predicted genders of user 101, individual 214, and individual 216. Further, each of data elements 360 and 362 can be associated with, and linked to, a corresponding unique identifier of user 101, individual 214, and individual 216, e.g., as specified within identifiers 342.

By way of example, described herein, characteristic prediction module 144 may perform any of the exemplary predictive processes described herein to determine (e.g., within an established accuracy of the trained stochastic statistical processes, machine learning processes, or artificial intelligence models) that user 101 corresponds to a male adult having a likely age of forty years, the individual 214 corresponds to a female adult having a likely age of thirty-nine years, and that individual 216 corresponds to a male child having a likely age of ten years. In some instances, characteristic prediction module 144 may package the predicted genders of user 101, individual 214, and individual 216 into corresponding ones of data elements 360, may package the likely ages of user 101, individual 214, and individual 216 into corresponding ones of data elements 362, and can associate each of data elements 360 and 362 with a corresponding, and appropriate, one of identifiers 342.

The disclosed embodiments are, however, not limited to processes that predict and output ages and genders characterizing user 101, individual 214, and individual 216 (and other individuals within digital image 210). In other instances, characteristic prediction module 144 may predict values of any additional, or alternate, parameters that characterize user 101, individual 214, individual 216, and other individuals within digital image 210, such as, but not limited to, a height, weight, or a hair color, based on an application of any of the exemplary analytical or predictive models, the stochastic statistical processes, the machine learning processes, or artificial intelligence models to image data elements 348 and/or facial position data 344.

In some instances (not illustrated in FIG. 3B), characteristic prediction module 144 may perform operations that store output data 358, including data elements 360 and 362, within a corresponding portion of processed image data store 134, and that associate stored output data 358 with image data 314, identifiers 342, facial position data 344, and image data elements 348. Further, as illustrated in FIG. 3B, characteristic prediction module 144 may also route output data 358 to relationship parsing module 146 of image processing engine 138, which may perform any of the exemplary processes described herein to determine a likely existence of a familial relationship between the individuals within digital image 210, and a likely structure of that familial relationship, based on the predicted, individual-specific parameter values characterizing each of the individuals (e.g., as maintained within output data 358) and additionally, or alternatively, based on corresponding ones of image data elements 348.

Relationship parsing module 146 may receive output data 358 from characteristic prediction module 144, and may perform operations that process output data 358 to identify a number of individuals within digital image 210 (e.g., based on a number of unique identifiers 342, etc.), and to extract the parameter values that characterize each of the individuals, such as, but not limited to, the predicted ages of user 101, individual 214, and individual 216 within data elements 360 and the predicted genders of user 101, individual 214, and individual 216 within data elements 362. In some instances, relationship parsing module 146 may generate elements of model input data that include, but are not limited to, the identified number of individuals (e.g., three), the predicted ages of user 101, individual 214, and individual 216 (e.g., as specified within data elements 360), and/or the predicted genders of user 101, individual 214, and individual 216 (e.g., as specified within data elements 362), and predict the existence of, and the structure of, a familial relationship between user 101, individual 214, and individual 216 based on an application of one or more predictive models to the generated model input data.

In one example, the predictive models may include one or more statistical classification processes, such as, but not limited to, a multinomial logistic regression. For instance, upon implementation by relationship parsing module 146, the multinomial logistic regression can model a structure of a familial relationship between user 101, individual 214, and individual 216 as a categorically distributed dependent variable and that predicts possible structures of that familial relationship given a set of real-valued independent variables, e.g., the number of individuals within digital image 210, the predicted ages, the predicted genders, etc.

In other examples, the predictive models may include, but are not limited to, a machine learning process or an artificial intelligence model, which relationship parsing module 146 may apply to elements of the generated model input data described herein (e.g., that specifies the number of individuals, the predicted ages, and/or the predicted genders), either alone or in combination with one or more of image data elements 348. For instance, the one or more machine learning processes or artificial intelligence models can be applied to the model input data in conjunction with corresponding ones of image data elements 348, which enables these machine learning processes or artificial intelligence models to predict the likely familial structure between user 101, individual 214, and individual 216 based not only on their predicted ages and genders, but also based on additional objective criteria within image data elements 348, such an existence of contact between the user 101 and individuals 214 and 216 or a distance between respective bodies of user 101 and individuals 214 and 216.

Examples of the machine learning processes can include, but are not limited to, an association-rule algorithm (such as an Apriori algorithm, an Eclat algorithm, or an FP-growth algorithm), a decision-tree algorithm (e.g., a classification-based algorithm or a regression-based algorithm), or a clustering algorithm (such as a hierarchical clustering process, a k-means algorithm, or other statistical clustering algorithms), and examples of the artificial intelligence models include, but are not limited to, an artificial neural network model, a recurrent neural network model, a Bayesian network model, or a Markov model. In some instances, these machine learning algorithms and or artificial intelligence models can be trained against, and adaptively improved using, training data having a specified composition (e.g., specifying the number of individuals and the predicted ages, range of ages, genders, etc.), which may be extracted from portions of processing image data store 134 along with corresponding outcome data (e.g., an existing familial relationship), and can be deemed successfully trained and ready for deployment when a model accuracy (e.g., as established based on a comparison with the outcome data), exceeds a threshold value.

Based on the application of one or more of the predictive models described herein to portions of the generated model input data and additionally, or alternatively, to corresponding ones of image data elements 348, relationship parsing module 146 can generate relationship data 364 that identifies and characterizes the predicted structure of the relationship between user 101, individual 214, individual 216, and each additional individual within digital image 210. For example, relationship data 364 may specify that individual 214 (e.g., the female adult aged thirty-nine years) represents a spouse or partner of user 101 (e.g., the male adult aged forty years), and that individual 216 (e.g., the male child aged ten years)

represents a child of user 101 and/or individual 214. In some instances, relationship data 364 may include information that characterizes each of the predicted relationship structures (e.g., spouse or partner, child, etc.), identifies each of the parties involved in the relationships (e.g., user 101, individual 214, and individual 216), and further, also specifies the predicted parameter values that characterize each of the parties (e.g., the predicted ages and genders, etc.).

In some instances (not illustrated in FIG. 3B), relationship parsing module 146 perform operations that store relationship data 364 within a corresponding portion of processed image data store 134, and that associate stored relationship data 364 with image data 314, identifiers 342, facial position data 344, image data elements 348, and output data 358 (e.g., including data elements 360 and 362). Further, and as illustrated in FIG. 3B, relationship parsing module 146 may also provide relationship data 364 as an input to policy origination engine 148 of provisioning system 130, which performs any of the exemplary processes described herein to identify and characterize one or more insurance policies that are available for provisioning to user 101 (e.g., via executed insurance application 106) and further, that are consistent with relationship data 364 and with values of the physical or demographic parameters of user 101 and the additional individuals within digital image 210 (e.g., as specified within output data 358).

In some embodiments, provisioning system 130 perform any of the exemplary processes described herein to recognize, within image data 314 transmitted programmatically to provisioning system 130 by executed insurance application 106, a face of user 101 and one or more additional individuals, to adaptively and dynamically predict values of certain demographic or physical parameters that characterize user 101 and the additional individuals based on the recognized faces and image data 314, and that predict an existence and a likely structure of a relationship between user 101 and each of the additional individuals within image data 314. In some instances, and in additional to images of user 101 and the additional individuals, captured digital image data 314 can also include an image of one or more physical objects associated with user 101, such as an image of a home or residence of user 101 and the additional information. As described herein in reference to FIG. 3D, image processing engine 138 of provisioning system 130 may perform additional operations that process digital image data 314 to recognize and identify the one or more physical objects within image data 314 and to predict values of parameters (e.g., object parameters) that characterize the one or more identified physical objects, either alone or based on data exchanged with one or more external computing systems.

Figure 3D:
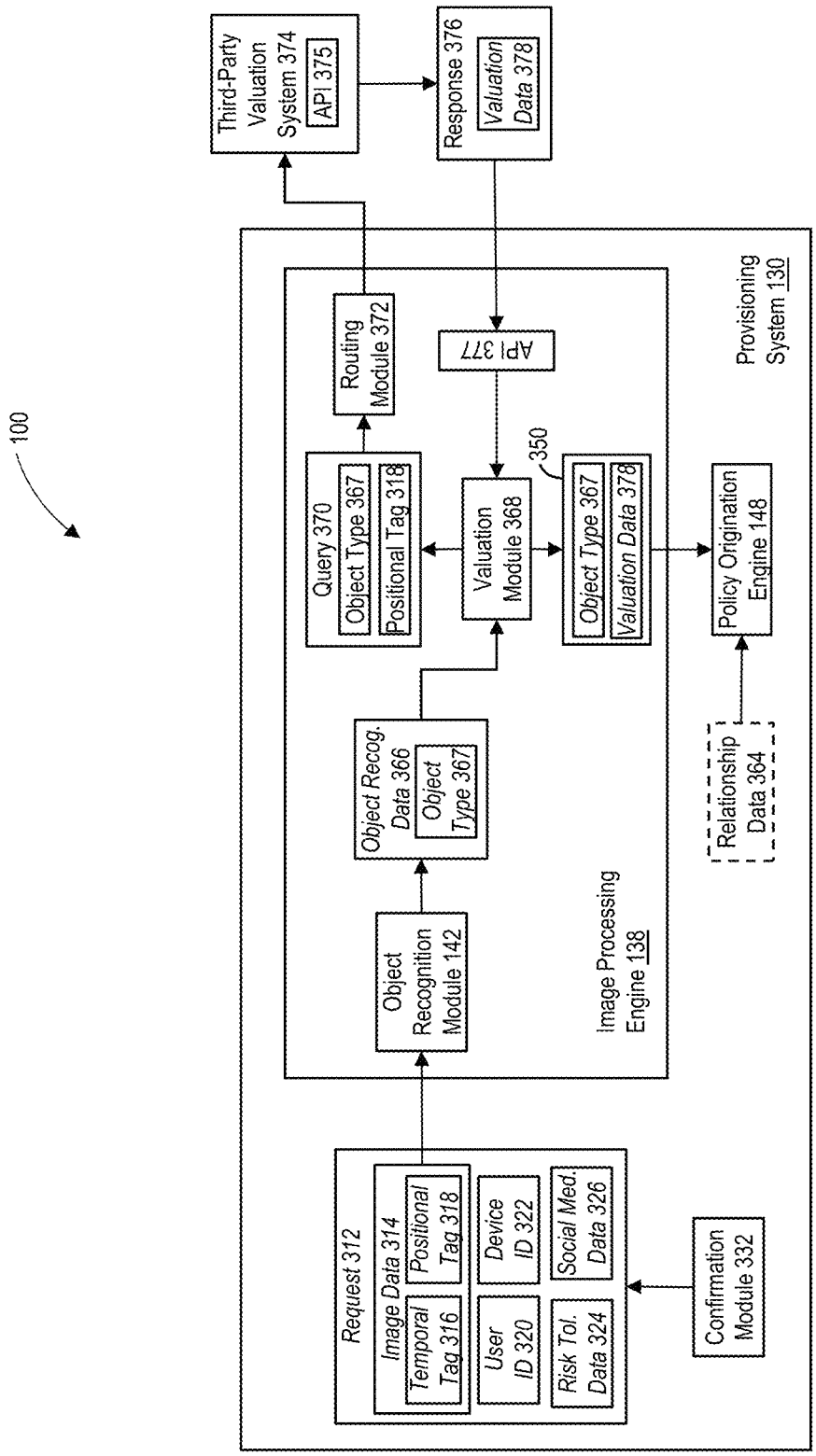
FIG. 3D is a diagram illustrating portions of an exemplary computing environment, consistent with the disclosed embodiments.

Referring to FIG. 3D, image processing engine 138 of provisioning system 130 may receive request 312 from confirmation module 332. Request 312 may include, among other things, image data 314, temporal tag 316, and positional tag 318, and image processing engine 138 may perform any of the exemplary processes described herein to store image data 314, temporal tag 316, and positional tag 318 (and other portions of request 312) within the corresponding portion of processed image data store 134 (not illustrated in FIG. 3D). As described herein, image data 314 may include images of a recognized face (and in some instances, all or a portion of a body) of user 101, individual 214, and individual 216. Further, image data 314 may also include all, or a portion of a physical object associated with user 101, such as physical object 218 illustrated above in FIG. 2C. Examples of physical object 218 include, but are not limited to, a single-family home in which user 101, individual 214, and individual 216 reside, or a vehicle operated by user 101, either alone or in conjunction with individuals 214 or 216.

In some examples, object recognition module 142 of image processing engine 138 may receive image data 314, and may apply one or more object recognition algorithms or processes to image data 314. Based on the application of the one or more object recognition algorithms, object recognition module 142 may recognize and identify the physical object within image data 314, e.g., physical object 218 of FIG. 2C, and generate object data 366 that specifies an object type 367 that characterizes the new-recognized physical object, e.g., the single-family home corresponding to physical object 218.

Examples of the one or more object recognition algorithms include, but are not limited to a statistical process (e.g., principal component analysis, a linear discriminant analysis, etc.), a computer visional algorithm or process (e.g., a template matching algorithm, a scale-invariant feature transform (SIFT) algorithm, an adaptive pattern recognition algorithm, a dynamic link matching algorithm based on wavelet transformations, etc.), a machine learning process (e.g., a multilinear subspace learning algorithm based on a tensor representation of image data sets, etc.), or an artificial intelligence model, such as an artificial neural network model, etc. Further, certain of these object recognition algorithms, such as the machine learning processes or the artificial intelligence models, can be trained against, and adaptively improved using, training data having a specified composition, which may be extracted from portion of processing image data store 134 along with corresponding outcome data (e.g., a proper object type), and can be deemed successfully trained and ready for deployment when a model accuracy (e.g., as established based on a comparison with the outcome data), exceeds a threshold value.

Referring back to FIG. 3D, object recognition module 142 may provide object data 366 as an input to a valuation module 368 of provisioning system 130. In some instances, valuation module 368 may receive object data 366, which includes information identifying the single-family home corresponding to now-recognized physical object 218, and may perform operations that access positional tag 318 of image data 314, e.g., as maintained within processed image data store 134. As described herein, positional tag 318 may specify a geographic position associated with image data 314 (e.g., a latitude, longitude, or altitude of client device 102 upon capture of image data 314), which also characterizes the single-family home corresponding to now-recognized physical object 218.

In some instances, valuation module 368 may perform operations that package object data 366, which specifies the object type (e.g., the single-family home) characterizing now-recognized physical object 218, and positional tag 318, which characterizes the geographic position of that single-family home, into corresponding portions of query 370. By way of example, positional tag 318 may indicate that the single-family home is disposed within the Georgetown neighborhood of Washington, D.C. (e.g., as identified by ZIP code 20007), and valuation module may provide query 370 as an input to routing module 372 of provisioning system 130. Routing module 372 may perform operations that identify a unique network address assigned to a third-party valuation system 374, which may be configured to determine an average value of the single-family home disposed in the geographic region specified by positional tag 318, and that cause provisioning system to transmit query 370 across network 120 to the unique network address of third-party valuation system 374.

As illustrated in FIG. 3D, third-party valuation system 374 may receive query 370 through a secure programmatic interface, such as application programming interface (API) 375. By way of example, third-party valuation system 374 may be associated with or operated by a regional multiple listing service (MLS), a real estate agent, or a governmental entity that records and monitors real estate sales and transfers (e.g., a record of deeds, a local tax assessment office, etc.). In response to the receipt of query 370, third-party valuation system 374 may interrogate one or more locally accessible data repositories or databases (not illustrated in FIG. 3D) to identify and extract an average valuation for a single-family home located in the geographic region specified by positional tag 318, e.g., the Georgetown neighborhood of Washington, D.C. In other instances, third-party valuation system 374 may also obtained, from the interrogated data repositories or databases, information characterizing one or more average parameter values that characterize a purchase of a single-family home within the located in the geographic region, such as, but not limited to, an average monthly payment for a mortgage having a specified term, e.g., thirty years, and a standard down payment, e.g., twenty percent.

For example, third-party valuation system 374 may determine that an average value or an average sales price of a single-family home within the Georgetown neighborhood of Washington, D.C., corresponds to US $850,0000, and an average monthly payment for a thirty-year mortgage in the Georgetown neighborhood of Washington, D.C., corresponds to US $4,300. Third-party valuation system 374 may perform operations that generate valuation data 378 that includes the average value or sales price (e.g., alone or in combination with the average monthly mortgage payment), and package valuation data 378 into a corresponding portion of response 376, which third-party valuation system 374 may transmit across network 120 to provisioning system 130.

A secure programmatic interface of provisioning system 130, such as application programming interface (API) 377 may receive and route response 376 back to valuation module 368. API 377 may be associated with or established by valuation module 368, and may facilitate secure, module-to-module communications across network 120 between valuation module 368 and routing module 372 of content provisioning system 150. In some examples, valuation module 368 may parse response 376 to extract valuation data 378, which includes the average value or sales price of the single-family home located in the geographic region specified by positional tag 318 (and in some instances, the average monthly payment for a mortgage in that geographic region). Further (not illustrated in FIG. 3D), valuation module 368 may also perform operations that store object data 366 and valuation data 378 within a corresponding portion of processed image data store 134, and that associate stored object data 366 and valuation data 378 with image data 314, identifiers 342, facial position data 344, image data elements 348, output data 358 (e.g., including data elements 360 and 362), and relationship data 364.

Valuation module 368 may also package valuation data 378 into a corresponding portion of output data 380, along with object type 367 of now-recognized physical object 218, e.g., the single-family home. As illustrated in FIG. 3D, valuation module 368 may provide output data 380 as an input to policy origination engine 148 of provisioning system 130, which performs any of the exemplary processes described herein to identify and characterize one or more insurance policies that are available for provisioning to user 101 (e.g., via executed insurance application 106) and further, that are consistent with relationship data 364, with values of the physical or demographic parameters of user 101 and the additional individuals within digital image 210 (e.g., as specified within output data 358), and further, with the valuation of the object type of now-recognized physical object 218 (e.g., as specified within output data 380).

Figure 4A:
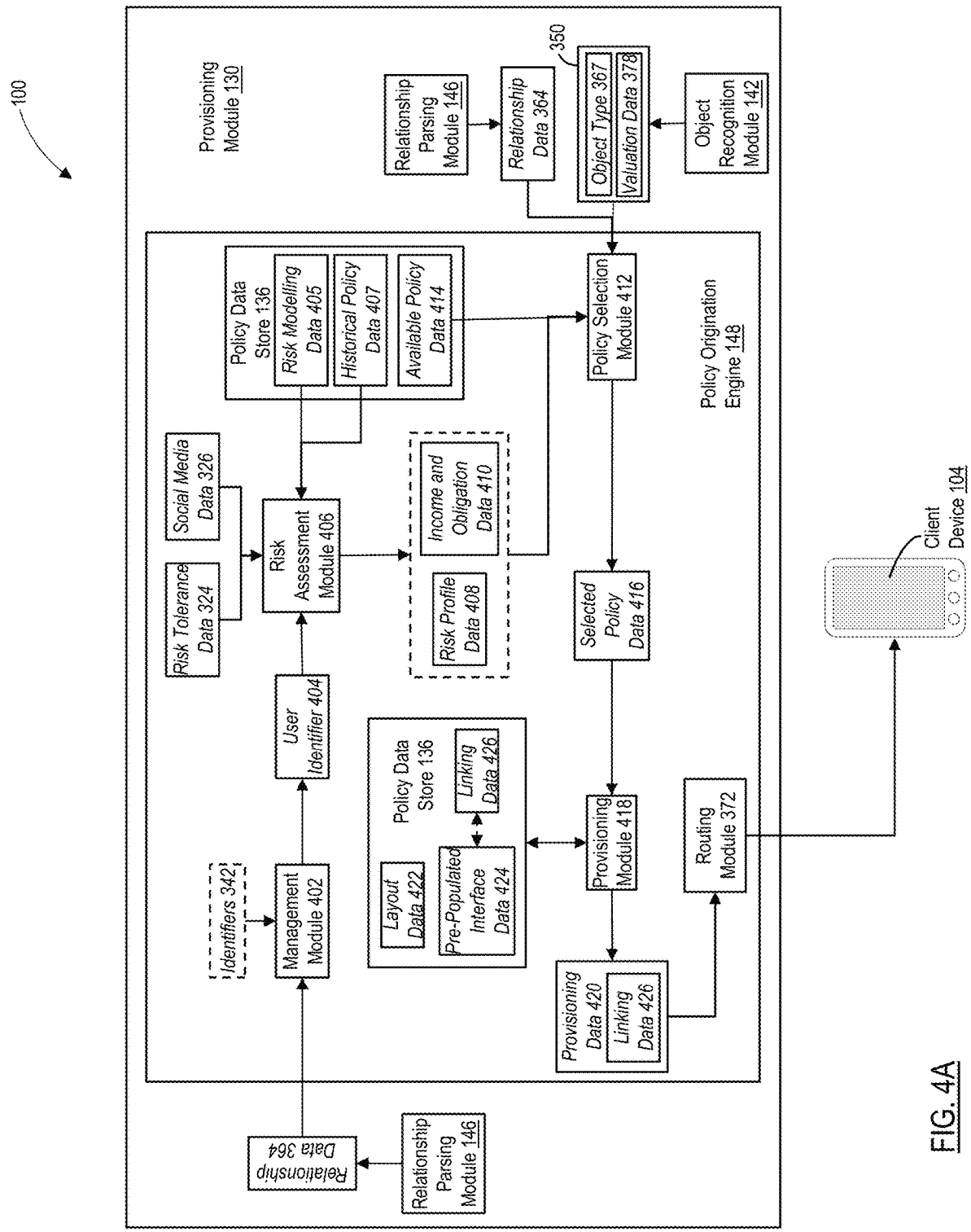
FIGS. 4A and 4B are diagrams illustrating portions of an exemplary computing environment, consistent with the disclosed embodiments

Referring to FIG. 4A, a management module 402 of policy origination engine 148 may receive relationship data 364, which identifies each of the individual within digital image 210 (e.g., identifiers 342 of user 101, individual 214, and individual 216), includes the predicted parameter values that characterize each of user 101, individual 214, and individual 216 (e.g., the predicted ages and genders, etc.), and include information characterizing the familial relationship between user 101 and each of individuals 214 and 216 (e.g., individual 214 is a partner or spouse of user 101, individual 216 is a child of user 101, etc.).

In some instances, management module 402 may parse relationship data 364 (and additionally, or alternatively, portions of processed image data store 134) to obtain data 404 that uniquely identifies user 101. For example, data 404 can include, among other things, user identifier 320 maintained within request 312 (e.g., an alphanumeric user name or a biometric credential associated with executed insurance application 106, etc.) or a corresponding one or identifiers 322 (e.g., as assigned to the recognized face of user 101 by image processing engine 138). Management module 402 may provide data 404 as an input to a risk assessment module 406, which may perform any of the exemplary processes described herein to determine a risk profile for user 101 that specifies a tolerance of user 101 to financial or insurance risk.

For example, risk assessment module 406 may receive data 404, which uniquely identifies user 101, and may access and extract, from processed image data store 134, data that establishes a risk profile characterizing the risk tolerance of user 101, e.g., risk tolerance data 324 of request 312. As described herein, risk tolerance data 324 may include a numerical score indicative of user 101's tolerance of financial or investment risk (e.g., ranging from zero (aversion to any risk) to unity (tolerance of substantial risk). In some examples, risk assessment module 406 may perform operations that extract the risk tolerance score from risk tolerance data 324, and package the risk-tolerance value into a corresponding portion of risk profile data 408. Further, and as described herein, risk tolerance data 324 may also characterize a financial position of user 101, such as, but not limited to, an annual income, information identifying obligations or debts owed by user 101, or a credit rating of user 101.

In some examples, risk assessment module 406 may extract risk modelling data 405 from one or more tangible, non-transitory memories (e.g., as maintained within policy data store 136 of FIG. 1), and perform operations that compute a risk tolerance score for user 101 in accordance with extracted risk modelling data 405. For instance, the extracted risk modelling data may correlate a particular risk tolerance score, or a range of risk tolerance score, to the current financial position of user 101 (e.g., the annual income of user 101, to the outstanding obligations or debts owed by user 101, the credit rating of user 101), the predicted family structure (e.g., as specified within relationship data 364), and additionally, or alternatively, a valuation of one or more physical objects owned by user 101 (e.g., as specified within object data 366 and valuation data 378). Risk assessment module 406 may perform operations package the computed risk-tolerance value into a corresponding portion of risk profile data 408 and additionally, or alternatively, may package information characterizing the current financial position of user 101 within a portion of income and obligation data 410.

In other examples, risk assessment module 406 may perform operations that determine a risk tolerance score for user 101 based on risk tolerance scores of other users of provisioning system that are demographically similar to user 101, or that are linked to user 101 within one or more social networks. For instance, risk assessment module 406 may access and extract demographic data characterizing user 101 (e.g., from risk tolerance data 324 or from portions of relationship data 366), and may access historical policy data 407 maintained within policy data store 136, which identifies insurance policies previously issued to the one or more users of provisioning system 130, identifies demographic data characterizing these users, and risk tolerance scores characterizing these one or more users, such as the risk tolerance scores described herein. In one example, risk assessment module 406 may apply one or more dynamic, machine learning processes (e.g., a clustering algorithm, a collaborative filtering algorithm, etc.) to portions of the demographic data characterizing user 101 and the accessed portions of historical policy data 407, and based on the application of the one or more dynamic, machine learning algorithms, risk assessment module 406 may compute a risk tolerance score for user 101 based on risk tolerances of demographically similar users of provisioning system 130.

Additionally, or alternatively, risk assessment module 406 may also access social media data 326, which identifies one or more users linked to user 101 through one or more social networks (e.g., Facebook™, LinkedIn™, Instagram™, etc.) and a strength or closeness of these linkages (e.g., a direct relationship between user 101 and a first user of the social networks, an indirect relationship linked user 101 and the first user through one or more intermediate, second users, etc.). Risk assessment module 406 may apply any of the exemplary machine learning processes described herein (e.g., the adaptive clustering algorithms, the collaborative filtering algorithms, etc.) to the demographic data characterizing user 101, the accessed portions of historical policy data 407, and the accessed portions of social media data 326. Based on the application of the one or more dynamic, machine learning algorithms, risk assessment module 406 may compute a risk tolerance score for user 101 based on risk tolerances of users of provisioning system 130 that not only demographically similar to user 101, but that are also linked to user 101 within the one or more social networks. In some instances, by leveraging social media data 326, risk assessment module 406 may predict a risk tolerance score that more accurately reflects the sentiment and expectation of user 101, e.g., when compared to risk tolerance scores based on mere demographic similarities.

Risk assessment module 406 may perform operations package the computed risk tolerance score into a corresponding portion of risk profile data 408 and additionally, or alternatively, may package information characterizing the current financial position of user 101 within a portion of income and obligation data 410. Further, risk assessment module 406 may provide route risk profile data 408 and income and obligation data 410 as respective inputs to a policy selection module 412 of policy origination engine 148. Further, and as illustrated in FIG. 4A, management module 402 may also provide all or a portion of relationship data 364 (an in some instances, object data 366 and valuation data 378) as additional inputs to policy selection module 412, which may perform any of the exemplary processes described herein to select one or more insurance policies that are available for purchase by user 101 and further, that are consistent with a familial structure, a current financial position, and a risk profile of user 101 (and in some instances, a single-family home or vehicle owned by user 101).

In some examples, and upon receipt of the input data described herein, policy selection module 412 may perform operations that access the structured or unstructured data records of policy data store 136 and obtain available policy data 414 that identifies one or more insurance policies (e.g., the life, health, homeowner's, or vehicle insurance policies described herein) available to the one or more users of executed insurance application 106, such as, but not limited to, user 101. In some instances, available policy data 414 may include, for each of the available insurance policies, a corresponding policy identifier, information characterizing a corresponding policy type (e.g., life, health, homeowner's, vehicle, etc.), and information characterizing an available amount or scope of coverage, an available coverage term, and data specifying or facilitating a determination of a corresponding premium. Further, available policy data 414 may also specify, for each of the available insurance policies, certain selection criteria that correlate the available amount or scope of coverage, an available coverage term, and/or the corresponding premium to a corresponding level of risk (e.g., a numerical risk tolerance score), to an underlying family structure (e.g., an existence of a spouse or partner or a number of children), to an ownership or value of a physical object, such as a single family home, or to an income or owed obligation of user 101.

By way of example, relationship data 364 may identify user 101 (e.g., a male adult having a predicted age of forty years), individual 214 (e.g., a female adult having a predicted age of thirty-nine years), and individual 216 (e.g., a male child having a predicted age of ten years), and may specify that individual 214 represents a likely spouse or partner of user 101, and individual 216 represents a likely child of user 101. Further, risk profile data 408 may associate user 101 with a risk tolerance score of 0.5 (e.g., on a scale from zero to unity), which indicates a moderate acceptance of financial or insurance risk by user 101. Further, object data 366 and valuation data 378 may also indicate that user 101 owns a single-family home in the Georgetown neighborhood of Washington, D.C., and that the single-family home is associated with an estimated value of US $850,000. Additionally, or alternatively, income and obligation data 410 may identify a yearly income of US $300,000 for user 101, and may specify that user 101 holds a mortgage on the single-family home associated with a US $4,300 monthly payment.

Based on these exemplary elements of input data, policy selection module 412 may query access available policy data 414 and identify one or more of the available policies that are consistent with the predicted family structure of user 101 (e.g., the predicted existence of the user 101's spouse (or partner) and child). In some instances, the scope or amount of coverage and the available coverage term for each of the identified insurance policies may be consistent with the current financial position of user 101 (e.g., as characterized by income and obligation data 410) and when appropriate, may be consistent with user 101's ownership of the single-family home or the obligation imposed on user 101 by that ownership.

In one example, each of the identified insurance policies can be characterized by a risk tolerance score that is consistent with the risk profile of user 101, e.g., the risk tolerance score of 0.5 as specified by risk profile data 408. In other instances, one or more of the identified insurance policies may be associated with potential levels of risk that exceed the risk tolerance of user 101 (e.g., that are associated with short terms, etc.) and additionally, or alternatively, with potential levels of risk that are more conservative that the risk tolerance of user 101 (e.g., that are supported by conservative, low-yield financial instruments, such as U.S. or Canadian governmental bonds). Further, and as described herein, the identified insurance policies may include one or more life insurance policies, including whole or term life insurance policies, a homeowner's insurance policy, or a health insurance policy.

For example, policy selection module 412 may identify a first term life insurance policy characterized by a thirty-year term, a level payout of US $1,000,000 that would exceed any outstanding mortgage on user 101's single-family home during that term, and a risk profile that is consistent with the moderate level of risk tolerated by user 101 (e.g., despite the possibility that user 101's expected lifespan may exceed the term of the first insurance policy). In other examples, policy selection module a second, whole life insurance policy providing a US $500,000 payout associated with a premium schedule that specifies an initial monthly premium (e.g., that exceeds an amount supporting the payout) that decreases by a specified amount on a yearly basis throughout user 101's lifetime. In some instances, the second, whole life insurance policy may also be associated with a risk profile that is consistent with user 101's moderate tolerance of risk.

The disclosed embodiments are, however, not limited to processes that select available life insurance policies that are consistent with user 101's family structure, current financial position, or ownership of real property. In other instances, policy selection module 412 may perform operations that identify one of more health insurance policies, one or more dental insurance policies, one or more policies providing prescription or vision coverage for user 101's family, or one or more policies indemnifying the real property owned by user 101. For example, and without limitation, policy selection module 412 may identify: (i) a first health insurance policy associated with a preferred provider organization (e.g., a PPO), a specified monthly premium that covers user 101's family, and a minimal yearly deductible; and (ii) a second health insurance policy associated with the same PPO, but being characterized by a reduced monthly premium and a significant yearly deductible. In some instances, a risk profile that characterizes the first health insurance policy may be consistent with user 101's tolerance of risk, but a risk profile of the second health insurance policy may indicate a risk level that exceeds user 101's tolerance, especially in view of the predict age of individual 216 (e.g., user 101's child) and the substantial yearly deductible.

In some examples, policy selection module 412 may extract, from available policy data 414, values of one or more parameters that characterize each of the selected insurance policies, such as, but not limited to, the amount or scope of coverage (e.g., a payout, a deductible, etc.), an available coverage term, and where applicable, a specified monthly or yearly premium for the first term life insurance policy, the second whole life insurance policy, the first health insurance policy, and the second health insurance policy. In other examples, certain of these parameter values, such as a decreasing premium for the second whole life insurance policy, may be computed by policy selection module 412 in accordance with user 101's current financial position, user 101's family structure, or user 101's ownership interests in real property, such as the single-family home.

Policy selection module 412 may perform operations that associate each of the extracted or computed policy parameter values with an identifier of the corresponding insurance policy, and may package the policy identifiers, and the corresponding extracted or computed policy parameter values, into corresponding portions of selected policy data 416. In some instances, policy selection module 412 may provide selected policy data 416 as an input to a provisioning module 418 of policy origination engine 148, which may perform operations that package all, or a portion of selected policy data 416 into provisioning data 420 for transmission to client device 102, e.g., across network 120 through a secure, programmatic interface.

In one example, provisioning module 418 may package, into provisioning data 420, an identifier of each of the selected insurance policies (e.g., first term life insurance policy, the second whole life insurance policy, the first health insurance policy, and the second health insurance policy), along with associated parameter values that characterize each of the selected insurance policies (e.g., the amount or scope of coverage (e.g., a payout, a deductible, etc.), the available coverage term, and the specified or computed monthly or yearly premium). In other instances, provisioning module 418 may also package additional information into provisioning data 420 that identifies and characterizes, among other things: the predicted family structure of user 101; the predicted physical or demographic parameter values of each member of user 101's family, e.g., based on an analysis of image data 314; the risk profile of user 101, e.g., the specified or computed risk tolerance score; or information that identifies and values the physical object recognized within digital image 210, e.g., the single family home.

In other examples, provisioning module 418 may perform operations that populate one or more digital interfaces associated with provisioning system 130 with portions of the assigned policy identifiers and corresponding ones of the extracted or computed policy parameter values described herein, that generate a corresponding deep link to the populated digital interfaces associated with each of the selected insurance policies, and the include data identifying the deep links within provisioning data 420, e.g., in addition to, or as an alternate to, the actual policy parameter values. For example, the digital interfaces may include discrete display screens capable of generation and presentation by executed insurance application 106, or one or more web pages associated with provisioning system 130 and capable of presentation by a web browser executed by client device 102.

By provisioning data characterizing the deep-linked digital interface screen or web pages, certain of these exemplary processes may reduce a volume and a complexity of input to client device 102 required to access data identifying one or more of the selected insurance policies and further, to initiate a purchase of one, or more, of the selected insurance policies and an underwriting of the purchased insurance policies by provisioning system 130, e.g., in the name of user 101 and listing individuals 214 and 216 of digital image 210 (e.g., respective ones of the predicted spouse or partner of user 101 and the predicted child of user 101). The reduction in the volume and the complexity of the required input can enhance an ability of user 101 to interface with the populated and deep-linked digital interfaces or web pages, especially when client device 102 corresponds to a device characterized by a reduced-functionality display unit and/or input unit, such as, but not limited to, a smart watch, a wearable or head-mounted device, or other wearable form factor.

For example, as illustrated in FIG. 4A, provisioning module 418 may access interface layout data 422 that includes information, e.g., metadata, that identifies and characterizes each of the interface elements disposed within the one or more display screens of the digital interface (e.g., as rendered for presentation by executed insurance application 106) or within the one or more web pages associated with provisioning system 130 (e.g., as rendered for presentation by the web browser executed by client device 102). Based on the accessed metadata within interface layout data 422, provisioning module 418 may perform operations that generate elements of pre-populated interface data 424 that correspond to each of the selected insurance policies and that associate, for each of the selected insurance policies, the policy identifier and extracted or computer policy parameter values with corresponding ones of the interface elements identified and characterized by interface layout data 422. In some instances, provisioning module 418 may perform operations that store pre-populated interface data 424 within one or more tangible, non-transitory memories, such as within a portion of policy data store 136.

Further, provisioning module 418 may also generate linking data 426 (e.g., corresponding to and establishing one or more "deep links") associated with corresponding ones of the pre-populated display screens or web pages and that point to corresponding portions of the pre-populated interface data 424, e.g., as maintained within policy data store 136. In one instance, linking data 426 may include a single data element (e.g., a single deep link) that points to a portion of pre-populated interface data 424, e.g., which facilitates a population of a display screen of the digital interface or a portion of a web page with all, or a selected portion, of pre-populated interface data 424. In other instances, linking data 426 may include multiple data element (e.g., multiple deep links), each of which point to a corresponding portion of pre-populated interface data 424. For example, each of the multiple deep links may point to a portion of pre-populated interface data 424 associated with a corresponding one of the selected insurance policies. As illustrated in FIG. 4A, provisioning module 418 may package all or a portion of linking data 426 within a corresponding portion of provisioning data 420, along with additional or alternate data that identifies one or more of the selected insurance policies, such as the unique identifiers of the selected insurance policies described herein.

Provisioning module 418 may provide provisioning data as an input to routing module 372 of provisioning system 130. In some instances, routing module 372 can perform operations that access a unique network address of client device 102, e.g., as maintained locally within one or more tangible, non-transitory memories, and that cause provisioning system 130 to transmit provisioning data 420 across network 120 to the unique network address of client device 102, e.g., using any appropriate communications protocol.

Figure 4B:
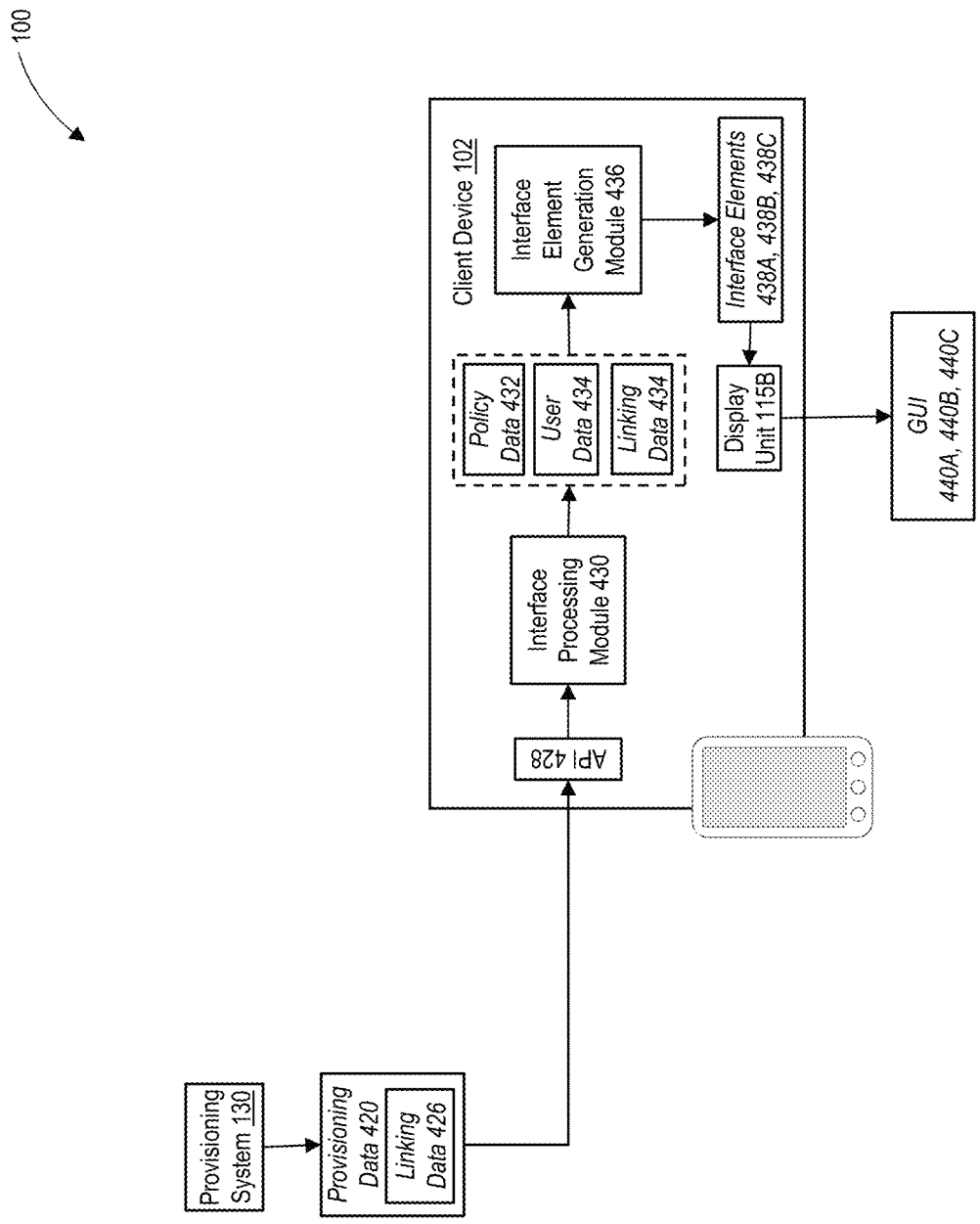

Referring to FIG. 4B, a secure programmatic interface of client device 102, e.g., application programming interface (API) 428, may receive provisioning data 420, which include the unique identifiers of each of the selected insurance policies, the extracted computed values of the policy parameters that characterize each of the selected insurance policies, data identifying and characterizing user 101 and user 101's predicted family structure, and in some instances, linking data 426 that points to portions of pre-populated interface data 424. API 428 routes provisioning data 420 to an interface processing module 430 of executed insurance application 106. In some instances, API 428 may be associated with or established by interface processing module 430, and may facilitate secure, module-to-module communications across network 120 between interface processing module 430 and routing module 372 of provisioning system 130.

In some examples, interface processing module 430 may parse provisioning data 420 to extract: (i) policy data 432, which includes the unique identifiers of each of the selected insurance policies and the extracted computed values of the policy parameters that characterize each of the selected insurance policies; (ii) user data 434, which includes the predicted familial structure of user 101, the predicted values of the physical or demographic parameter that characterize user 101 and each member of user 101's family (e.g., based on the adaptive analysis of image data 314 using any of the processes described herein), user 101's ownership interest in the physical object within digital image 210, and additionally, or information characterizing user 101's risk tolerance or current financial state; and where appropriate (iii) linking data 426, which identifies and specifies the deep links to pre-populated interface data 424 maintained by provisioning system 130. As illustrated in FIG. 4B, interface processing module 430 may provide one or more of policy data 432, user data 434, or linking data 426 as an input to an interface element generation module 436 of executed insurance application 106.

In one example, interface element generation module 436 may process policy data 432, and may generate and route one or more interface elements 438A to display unit 115A of client device 102, which may render interface elements 438A for presentation to user 101 within a graphical user interface (GUI) 440A. In some instances, GUI 440A may represent a digital interface generated by executed insurance application 106, and may facilitate an initiation of a transaction to purchase one, or more, of the selected insurance policies, e.g., the first term life insurance policy, the second whole life insurance policy, the first health insurance policy, and the second health insurance policy. For example, GUI 440A may include corresponding interface elements that identify one or more of the selected insurance policies (e.g., that include corresponding ones of the assigned policy identifiers), along with additional interface elements, such as static text boxes, that specify values of the policy parameters that characterize each of the selected insurance policies, and additional selectable interface elements, such as check boxes or selectable icons, that prompt user 101 to provide additional input to client device 102, e.g., via input unit 115B, requesting further information on a corresponding one of the selected insurance policies or requesting an initiation of a transaction to purchase a corresponding one of the selected insurance policies.

Figure 5A:
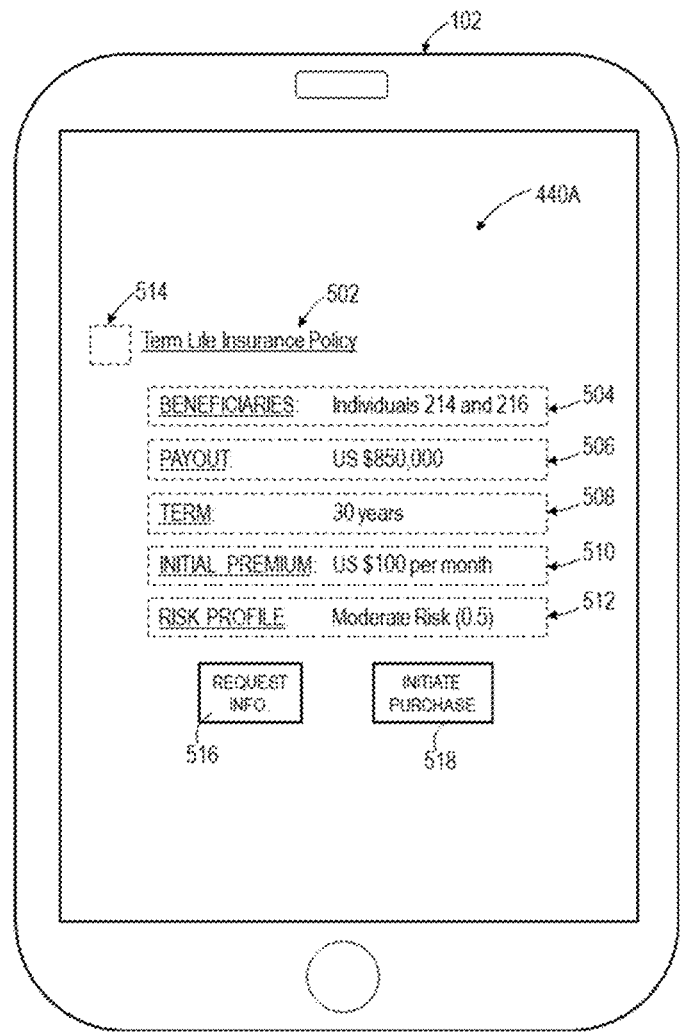
FIGS. 5A, 5B, and 5C are diagrams illustrating portions of an exemplary graphical user interface, consistent with the disclosed embodiments.

For example, in reference to FIG. 5A, GUI 440A may correspond to a first display screen of a digital interface generated by executed insurance application 106, and may include an interface element 502 that identifies a first one of the selected insurance positions, e.g., the first term life insurance policy characterized by a thirty-year term and a level payout of US $1,000,000. In some instances, interface element 502 may include all or a portion of the unique policy identifier assigned to first term life insurance policy. Further, as illustrated in FIG. 5A, GUI 440A may also include additional interface elements that identify the policy parameters characterizing each of the selected insurance policies and the value of these policy parameters, such as, but not limited to: interface element 504 that identifies one or more beneficiaries of the first term life insurance policy (e.g., individuals 214 and 216); interface element 506 that identifies the level payment (e.g., US $1,000,000); interface element 508 that identifies the term (e.g., thirty years); interface element 510 that identifies an initial monthly premium of the first term life insurance policy (e.g., US $100.00)I; and interface element 512 that identifies a risk profile of the first term life insurance policy (e.g., moderate).

Further, as illustrated in FIG. 5A, GUI 440A may include additional interface elements, such as check box 514 and selectable icons 516 and 518, that prompt user 101 to provide additional input to client device 102, e.g., via input unit 115B, requesting further information on the first term life insurance policy or requesting an initiation of a purchase of the first term life insurance policy. For example, user 101 may provide, to input unit 115B of client device 102, any of the exemplary input described herein to select check box 514, and to further select either icon 516 (e.g., to request additional information on the first term life insurance policy) or icon 518 (e.g., to request an initiation of a purchase of the first term life insurance policy).

Referring back to FIG. 4B, interface element generation module 436 may also process linking data 426, either alone or in conjunction with portions of policy data 432. Interface element generation module 436 may generate and route one or more additional interface elements 438B to display unit 115A of client device 102, which may render interface elements 438B for presentation to user 101 within a graphical user interface (GUI) 440B. In some instances, GUI 440B may represent a digital interface generated by executed insurance application 106, and may present one or more hyperlinks or deep links to pre-populated interfaces characterizing corresponding ones of the selected insurance policies, e.g., the first term life insurance policy, the second whole life insurance policy, the first health insurance policy, and the second health insurance policy.

Figure 5B:
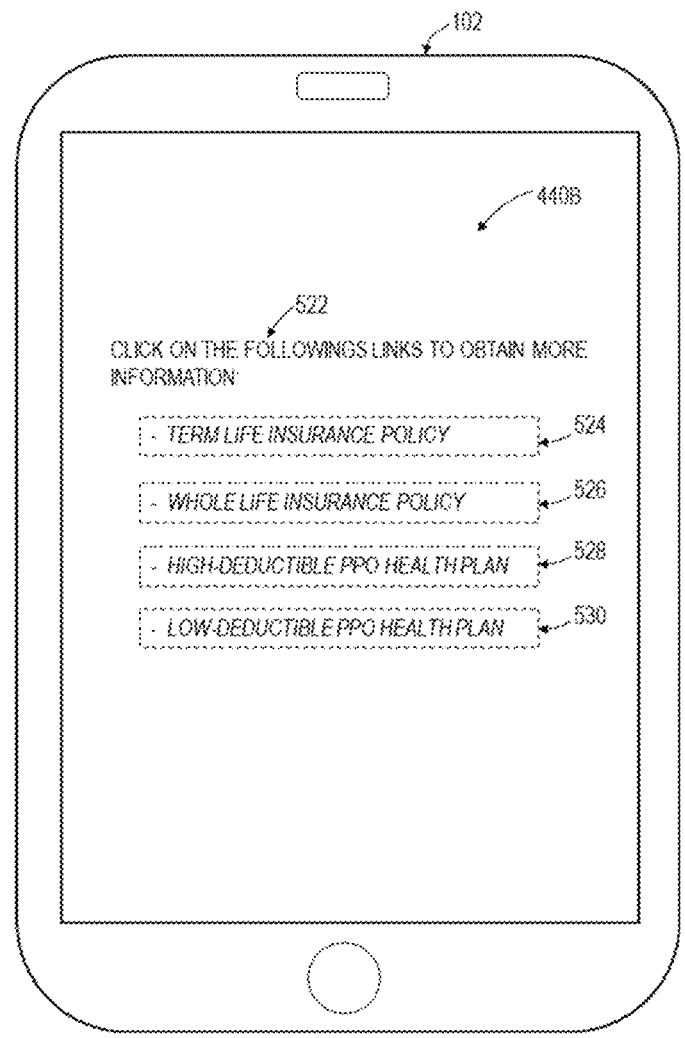

For example, as illustrated in FIG. 5B, GUI 440B may include interface elements 522 that prompt user 101 to select one or more of the hyperlink or deep links pointing to pre-populated interface data characterizing one or more of the selected insurance policies, e.g., as maintained by provisioning system 130. GUI 440B may also include selectable interface elements that corresponding to each of the hyperlinks or deep links described herein, such as, but not limited to: selectable interface element 524, which represents a deep link to the pre-populated interface data associated with the first term life insurance policy; selectable interface element 526, which represents a deep link to the pre-populated interface data associated with the second whole life insurance policy; selectable interface element 528, which represents a deep link to the pre-populated interface data associated with the high-deductible PPO health insurance policy; and selectable interface element 530, which represents a deep link to the pre-populated interface data associated with the low-deductible PPO health insurance policy.

In some instances, not illustrated in FIG. 5B, user 101 may provide any of the exemplary input described herein to select interface element 524 and as such, to select the deep link to the pre-populated interface data associated with the first term life insurance policy. In response to the selection of interface element 524, executed insurance application 106 may perform operations that package an identifier of the deep link (e.g., a pointer, deep-link identifier, etc.) into a request for the corresponding portion of the pre-populated interface data, which client device 102 may transmit across network 120 to provisioning system 130, e.g., via API 330. In some instances, provisioning system 130 may process the request, access and extract the requested portion of pre-populated interface data, e.g., from pre-populated interface data 424 of FIG. 4A, and can transmit the requested portion of pre-populated interface data across network 120 to client device 102, e.g., via API 428. Executed insurance application 106 can populate a corresponding display screen of the digital interface using the requested portions of the pre-populated interface data associated with the first term life insurance policy (e.g., including interface elements similar to those described above in reference to FIG. 5A).

In additional examples, and in reference to FIG. 4B, interface element generation module 436 may also process all or a portion of user data 434 and generate and route one or more further interface elements 438C to display unit 115A of client device 102, which may render interface elements 438C for presentation to user 101 within a graphical user interface (GUI) 440C. In some instances, GUI 440C may represent a digital interface generated by executed insurance application 106, and may enable user 101 to confirm an accuracy of the predicted structure of user 101's family, the predicted values of the physical or demographic parameters that characterize each family member, and a predicted type of object present within digital image 210.

Figure 5C:
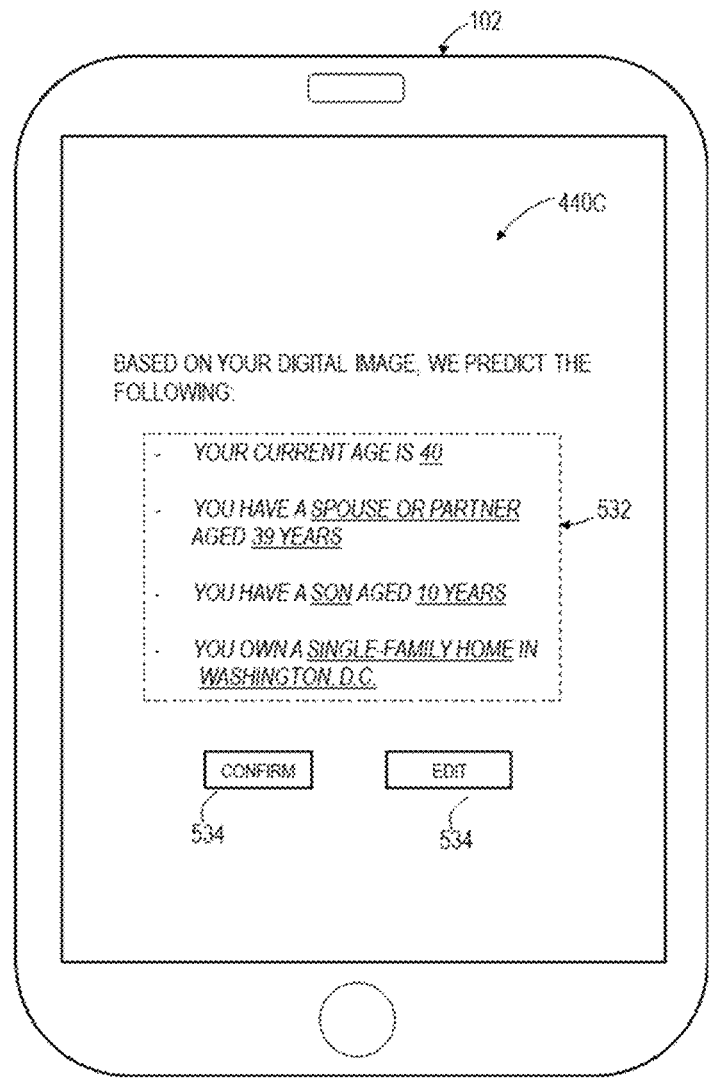

Referring to FIG. 5C, GUI 440C may include interface elements 532 that confirm, to user 101, the predicted structure of user 101's family (e.g., including a female spouse or partner and a male child), the predicted age of the female spouse or partner (e.g., thirty-nine years), the predicted age of the male child (e.g., ten years), and the type of object detected within digital image 210 (e.g., a single-family home in the Georgetown neighborhood of Washington, D.C.). Further, GUI 440C may include additional interface elements, selectable icons 534 and 536, that prompt user 101 to provide additional input to client device 102, e.g., via input unit 115B, confirming an accuracy of the presented data or requesting an opportunity to modify or correct one or more elements of the presented data.

For example, user 101 may provide, to input unit 115B of client device 102, any of the exemplary input described herein to select icon 534, which confirms the accuracy of the predicted familial structure, predicted ages and genders, and the predicted object type. In response to the selection of icon 534, executed insurance application 106 may perform operations that generate and transmit confirmation data across network 120 to provisioning system 130, which may store the confirmation data within a corresponding portion of processed image data store 134 and may associate the confirmation data with image data 314, relationship data 364, and object data 366. Further, provisioning system 130 perform operations that train, and adaptively improve, any of the dynamic algorithms or processes described herein using the now-confirmed family structure, physical or demographic parameter value, and object type.

In other examples, user 101 may provide, to input unit 115B of client device 102, any of the exemplary input described herein to select icon 536, which requests an opportunity to modify or correct one or more of the predicted familial structure, predicted ages and genders, or the predicted object type. In response to the selection of icon 536, executed insurance application 106 may perform that generate and present an additional digital interface that facilitates the modification of the one or more of the predicted familial structure, predicted ages and genders, or the predicted object type, and can transmit all or a portion of the modifications across network 120 to provisioning system 130, e.g., for future training and adaptive improvement of any of the dynamic algorithms and processes described herein.

Figure 6:
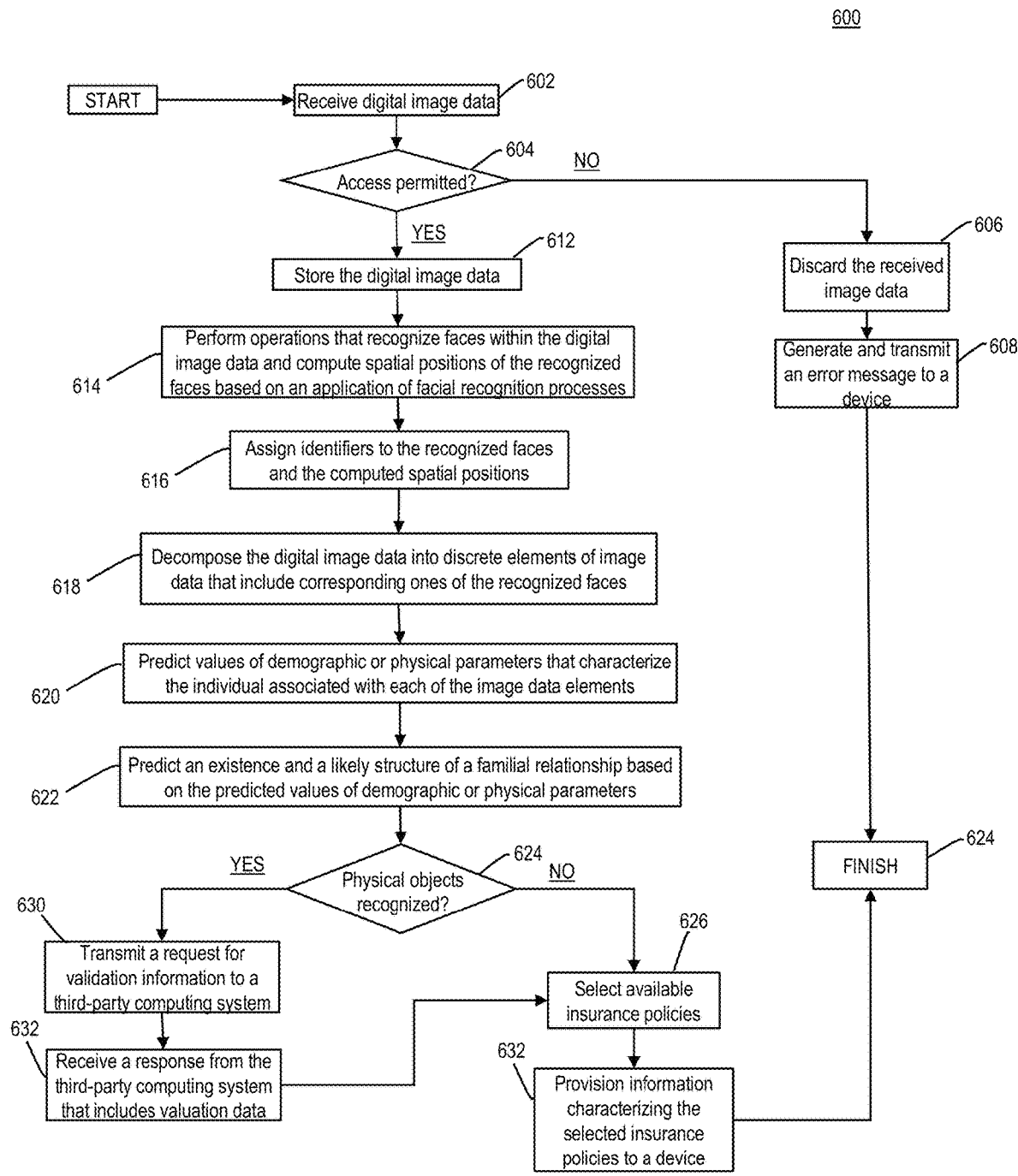
FIG. 6 is a flowchart of an exemplary process for dynamically provisioning exchanges of data based on processed image data, consistent with the disclosed embodiments.

FIG. 6 is a flowchart of an exemplary process 600 for dynamically provisioning exchanges of data based on detected relationships within processed image data, in accordance with the disclosed embodiments. In some examples, a network-connected computing system, such as provisioning system 130 of FIG. 1, may perform one or more of the exemplary steps of process 600.

Referring to FIG. 6, provisioning system 130 may receive digital image data from a network-connected device, e.g., client device 102 of FIG. 1, across a corresponding communications network (e.g., in step 602). In some instances, described herein, the digital image data may correspond to a digital image identifying one or more individuals, including a user that operates client device 102 (e.g., user 101 of FIG. 1) and one or more additional individuals (e.g., individuals 214 and 216 of FIG. 2B), either alone or in conjunction with one or more physical objects, such as a home in which user 101 resides. Further, the digital image data may be captured by a digital camera embedded into client device 102 (e.g., digital camera 116 of FIG. 1) or may be received by client device 102 from an additional network-connected system or device.

As described herein, the digital image data may include a temporal tag, which identifies at time or date at client device 102 captured or received the digital image data, and a positional tag, which identifies a geographic position of client device 102 at the time or date described herein. Further, the received signal may also include a unique identifier of client device 102 (e.g., an IP address, a MAC address, etc.) and additionally, or alternatively, a unique identifier of a user that operates client device 102, such as user 101 of FIG. 1 (e.g., a user name, a biometric credential, etc.).

By way of example, an application program executed by client device 102, e.g., executed insurance application 106 of FIG. 1, can perform operations that cause client device 102 to transmit the digital image data, the user identifier, and the device identifier signal across the communications network to provisioning system 130. In some instances, provisioning system 130 may parse the received signal to extract the user or the device identifier, and based on the extracted user and/or device identifier, confirm whether user 101 or client device 102 are permissioned to access provisioning system 130 (e.g., in step 604). For example, in step 604, provisioning system 130 can access locally maintained copies of the user or device identifiers, and perform operations that establish a consistency, or an inconsistency, between the extracted and local copies of the user or device identifiers.

If, for example, provisioning system 130 were to detect an inconsistency between extracted and local copies of the user or device identifiers (e.g., step 604; NO), provisioning system 130 may determine that user 101 or client device 102 lack permission to access provisioning system 130. In response to the determined lack of permission, provisioning system 130 may discard the digital image data received from client device 102 (e.g., in step 606) and generate and transmit an additional signal to client device 102 that includes an error message indicative of user 101 or client device 102 lack permission to access provisioning system 130 (e.g., in step 608). Exemplary process 600 is then complete in step 610.

Alternatively, if provisioning system 130 were to establish a consistency between the extracted and local copies of the user or device identifiers (e.g., step 604; YES), provisioning system 130 can perform operations that store the digital image data, the temporal tag, and/or the positional tag within one or more tangible, non-transitory memories, such as within a portion of processed image data store 134 of FIG. 1 (e.g., in step 612). Based on an application of one or more facial recognition algorithms or processes to portions of the digital image data, provisioning system 130 may perform any of the exemplary processes described herein to recognize a face of user 101 and each additional individuals within the digital, e.g., individuals 214 and 216 of FIG. 2B), and to determine spatial positions that characterize each of the recognized faces within the digital image data (e.g., in step 614). In some instances, provisioning system 130 may assign a unique identifier to each of the recognized faces and to corresponding portions of the determined spatial positions (e.g., in step 616), and may perform any of the exemplary processes described herein to decompose the digital image data into discrete elements of image data that include corresponding ones of the recognized faces of user 101 and the additional individuals (e.g., in step 618).

Based on the discrete image data files, provisioning system 130 may perform any of the exemplary processes described herein to predict values of physical or demographic parameters that characterize each of the individuals within the digital image, such as user 101, individual 214, and individual 216 (e.g., in step 620). Examples of these physical or demographic parameters can include, but are not limited to, an age, a gender, a hair color, a height, or a weight of user 101, individual 214, and individual 216.

In one example, in step 620, provisioning system 130 may predict the value of one or more of these parameters based on an application of one or more analytical models, empirical models, or statistical processes to the image data elements, to the spatial positions of the recognized faces within the digital image, and to spatial positions of features within the recognized faces. In other examples, in step 620, provisioning system 130 may predict one or more of the parameter values based on an application of one or more of the exemplary stochastic statistical processes, machine learning algorithms, or artificial intelligence models described herein to each of the image data elements (e.g., portions of the digital image data that include corresponding ones of the recognized faces), raw or processed portions of the facial position data described herein, and additionally, or alternatively, each of the discrete image data files in conjunction with the raw or processed portions of the facial position data.

Referring back to FIG. 6, provisioning system 130 may perform any of the exemplary processes described herein to predict an existence of a familial relationship between user 101 and the additional individuals within the digital image, and to predict a likely structure of the familial relationship (e.g., in step 622). For example, and as described herein, provisioning system 130 may perform any of the exemplary processes described to recognize, within the digital image data, faces of three distinct individuals (e.g., in steps 614 and 616), and to predict likely values of parameter that characterize each of the individuals, such as an age and a gender (e.g. in step 620). Based on the application of one or more of the exemplary statistical classification processes, machine learning processes, or the artificial intelligence models described herein to the detected recognized faces of the distinct individuals, the predicted parameter values that characterize the distinct individuals, and additionally, or alternatively, to corresponding ones of the image data elements, provisioning system 130 may perform operations that predict the existence of, and the structure of, a familial relationship between the distinct individuals (e.g., in step 622).

In step 624, provisioning system 130 can apply one or more of the exemplary object recognition algorithms or processes to portions of the digital image data to determine whether the underlying digital image includes one or more physical objects associated with user 101, such as a single family home or a vehicle. If provisioning system 130 were unable to recognize any physical objects within the digital image data (e.g., step 624; NO), provisioning system 130 may perform any of the exemplary processes described herein to select, for provisioning to client device 102, one or more insurance policies that are available to user 101 and further, characterized by policy parameters consistent with the predicted family structure, the predicted values of the physical or demographic parameters that characterize user 101 and the family members, with a current financial position of user 101 (e.g., an income, etc.), and additionally, or alternatively, with a risk profile or risk tolerance of user 101 (e.g., in step 626). By way of example, the one or more selected insurance policies can include, but are not limited to, term or whole life insurance policies, PPO or HMO health insurance policies, dental, vision, or prescription insurance policies described herein.

In some instances, provisioning system 130 may perform operations that transmit information characterizing each of the selected insurance policies, including, but not limited, a corresponding policy identifier and corresponding values of policy parameters (e.g., a term, an amount or type of coverage, a premium, one or more beneficiaries, a deductible, etc.) to client device 102 (e.g., in step 628). As described herein, an application program executed by client device 102, such as executed insurance application 106, can perform operations that render all or a portion of the information characterizing the selected insurance policies within one or more screens of a digital interface, and user 101 can provide additional input to client device 102 that requests additional information, or an initiation of a purchase of, one or more of the selected insurance policies. Exemplary process 600 is then complete in step 610.

Referring back to step 624, if provisioning system 130 were to recognize a physical object, such as a single-family home, within the digital image data (e.g., step 624; YES), provisioning system 130 may perform any of the exemplary processes described herein to transmit data identifying a type of the recognized object (e.g., the single family home) and the positional tag associated with the digital image data (e.g., specifying a geographic position at which client device 102 captured the digital image data) to a third-party valuation system (e.g., in step 630). The third-party valuation system can perform any of the exemplary processes described herein to provide, to provisioning system 130, an average valuation or sales price of the recognized object type based on the specified geographic position (e.g., a mean or median sales price of single family homes in a neighborhood that includes the specified geographic position).

In some instances, provisioning system 130 may receive valuation data from the third-party valuation system that includes the average valuation of the recognized physical object, e.g., the mean or median value of the single-family home (e.g., in step 632). Exemplary process 600 then passes back to step 626, and provisioning system 130 may perform any of the exemplary processes described herein to select, for provisioning to client device 102, one or more insurance policies that are not only available to user 101 and characterized by policy parameters consistent with the predicted family structure, the predicted values of the physical or demographic parameters that characterize user 101 and the family members, with a current financial position of user 101 (e.g., an income, etc.), and with a risk profile or risk tolerance of user 101, but ae also consistent with the recognized physical object and the determined valuation.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including image processing engine 138, facial recognition module 140, object recognition module 142, characteristic prediction module 144, relationship parsing module 146, policy origination engine 148, image selection module 304, policy request module 310, routing module 328, API 330, confirmation module 332, valuation module 368, routing module 372, API 377, management module 402, risk assessment module 406, policy selection module 412, provisioning module 418, API 428, interface processing module 430, and interface element generation module 436, can be implemented as one or more computer programs, i.e., one or more modules of computer program instructions encoded on a tangible non transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
a communications unit;
a storage unit storing instructions; and
at least one processor coupled to the communications unit and the storage unit, the at least one processor being configured to execute the instructions to:
receive a first signal from a device via the communications unit, the first signal comprising image data that identifies a plurality of individuals, the individuals being associated with an exchange of data;
apply a trained machine learning process to elements of the image data, and based on the application of the trained machine learning process to the elements of the image data, determine, for each of the individuals, a value of a first characteristic of the corresponding individual, the first characteristic including one of a physical or a demographical parameter of the individuals;
generate relationship data characterizing a structure of a familial relationship between at least two of the individuals based at least in part on the values of the first characteristic associated with the at least two of the individuals;
determine candidate parameter values that characterize the data exchange based on portions of the values of the first characteristic and the relationship data, the candidate parameter values representing discrete elements of a policy associated with the data exchange; and
generate and transmit, to the device via the communications unit, a second signal that includes the candidate parameter values, the second signal comprising information that causes an application program executed by the device to present at least a portion of the candidate parameter values within a digital interface.

2. The apparatus of claim 1, wherein the at least one processor is further configured to execute the instructions to:
apply a trained facial recognition process to one or more of the elements of the image data;
recognize a face of each of the individuals within the image data based on the application of the trained facial recognition process;
determine positional data characterizing first spatial positions of the recognized face of each of the individuals within the image data; and
generate the relationship data characterizing the relationship between the at least two individuals based on the values of the first characteristic and the first spatial positions of the recognized faces within the image data.

3. The apparatus of claim 2, wherein the at least one processor is further configured to execute the instructions to:
based on the first spatial positions, decompose the image data into a plurality of image data elements, each of the image data elements including a corresponding one of the recognized faces of the individuals; and
determine the values of the first characteristic based on an analysis of the image data elements, the values of the first characteristic comprising an age, a gender, a height, or a weight of the individuals.

4. The apparatus of claim 2, wherein the at least one processor is further configured to execute the instructions to:
based on the application of the facial recognition process, identify one or more facial features within each of the recognized faces; and
determine second spatial positions that characterize the one or more identified features within each of the recognized faces.

5. The apparatus of claim 4, wherein the at least one processor is further configured to execute the instructions to determine the values of the first characteristic, the first spatial positions, and the second spatial positions.

6. The apparatus of claim 4, wherein the at least one processor is further configured to execute the instructions to:
generate input data comprising the one or more elements of the image data and at least one of the first spatial positions or the second spatial positions;
apply the trained machine learning process to the input data;
determine the values of the first characteristic based on the application of the trained machine learning process to the input data; and
generate the relationship data characterizing the structure of the familial relationship between the at least two individuals in accordance with the values of the first characteristic.

7. The apparatus of claim 1, wherein the at least one processor is further configured to execute the instructions to:
apply the trained machine learning process to model data that includes at least one of the values of the first characteristic of the individuals and the one or more elements of the image data that identifies the individuals;
based on the application of the trained machine learning process, to the model data, determine a value of a second characteristic of the familial relationship between the at least two individuals, the second characteristic value being consistent with the first characteristic values; and
determine the candidate parameter values based on portions of the values of the first characteristic and the values of the second characteristic.

8. The apparatus of claim 7, wherein the value of the second characteristic indicates the familial relationship between the at least two individuals identified within the image data.

9. The apparatus of claim 1, wherein the at least one processor is further configured to execute the instructions to:
apply a trained object recognition process to one or more elements of the image data;
based on the application of trained object recognition process, recognize a physical object within the image data and determine an object type associated with the recognized physical object; and
determine the candidate parameter values based on portions of the values of the first characteristic, the relationship data, and the object type.

10. The apparatus of claim 9, wherein the at least one processor is further configured to execute the instructions to:
generate and transmit, via the communications unit, a third signal to a third-party device that requests a value of a second characteristic of the recognized physical object;
receive, via the communications unit, a fourth signal that includes the value of the second characteristic; and
determine the candidate parameter values based on portions of the values of the first characteristic, the relationship data, the object type, and the value of the second characteristic.

11. The apparatus of claim 1, wherein:
the executed application program causes the device to generate and transmit the first signal to the apparatus; and
the executed application program causes the device to perform operations that capture the image data via a digital camera or that receive the image data from a third-party device.

12. The apparatus of claim 1, wherein the at least one processor is further configured to execute the instructions to:
generate input data comprising the values of the first characteristic associated with the at least two of the individuals;
apply an additional trained machine learning process to the generated input data; and
generate at least a portion of the relationship data based on the application of the additional trained machine learning process to the generated input data.

13. The apparatus of claim 1, wherein:
the image data identifies the plurality of individuals during a first temporal interval; and
the at least one processor is further configured to execute the instructions to:
generate elements of training data associated with second temporal interval disposed prior to the first temporal interval, the generated elements of training data comprising additional elements of image data identifying corresponding plurality of individuals during the second temporal interval and outcome data comprising characteristics of each of the plurality of individuals; and
perform operations that train the machine learning process based on an application of the machine learning process to the generated elements of training data; and
apply the trained machine learning process to the elements of the image data that identify the plurality of individuals during the first temporal interval.

14. A computer-implemented method, comprising:
receiving, by at least one processor, a first signal from a device, the first signal comprising image data that identifies a plurality of individuals associated with an exchange of data;
by the at least one processor, applying a trained machine learning process to elements of the image data, and based on the application of the trained machine learning process to the elements of the image data, determining, for each of the individuals, a value of a first characteristic of the corresponding individual, the first characteristic including one of a physical or a demographical parameter of the individuals;
generating, by the at least one processor, relationship data characterizing a structure of a familial relationship between at least two of the individuals based at least in part on the values of the first characteristic associated with the at least two of the individuals;
determining, by the at least one processor, candidate parameter values of that characterize the data exchange based on portions of the values of the first characteristic and the relationship data, the candidate parameter values representing discrete elements of a policy associated with the data exchange; and
generating and transmitting, by the at least one processor, a second signal to the device that includes the candidate parameter values, the second signal comprising information that causes an application program executed by the device to perform operations that present at least a portion of the candidate parameter values within a digital interface.

15. The computer-implemented method of claim 14, further comprising:
applying a trained facial recognition process to one or more of the elements of the image data;
recognizing a face of each of the individuals within the image data based on the application of the trained facial recognition process;
determining positional data characterizing first spatial positions of the recognized face of each of the individuals within the image data; and
generating the relationship data characterizing the relationship between the at least two individuals based on the values of the first characteristic and the first spatial positions of the recognized faces within the image data.

16. The computer-implemented method of claim 15, further comprising:
based on the first spatial positions, decomposing the image data into a plurality of image data elements, each of the image data elements including a corresponding one of the recognized faces of the associated individuals; and
determining the values of the first characteristic based on an analysis of the image data elements, the values of the first characteristic comprising an age, a gender, a height, or a weight of the individuals.

17. The computer-implemented method of claim 15, further comprising:
based on the application of the facial recognition process, identifying one or more facial features within each of the recognized faces of the individuals; and
determining second spatial positions that characterize the one or more identified facial features within each of the recognized faces.

18. The computer-implemented method of claim 17, further comprising determining the values of the first characteristic values based on the analysis of the image data, the first spatial positions, and the second spatial positions.

19. The computer-implemented method of claim 17, further comprising:
generating input data comprising of the one or more elements of the image data and at least one of the first spatial positions or the second spatial positions;
applying the trained machine learning process to the input data;
determining the values of the first characteristic based on the application of the trained machine learning process to the input data; and
generating the relationship data characterizing the structure of the familial relationship between the at least two individuals in accordance with values of the first characteristic.

20. The computer-implemented method of claim 14, further comprising:
applying the trained machine learning process to model data that includes the values of the first characteristic of the individuals and the one or more elements of the image data that identifies the individuals;
based on the application of the trained machine learning process to the model data, determining a value of a second characteristic of the relationship between the individuals, the value of the second characteristic value being consistent with the values of the first characteristic, and the value of the second characteristic indicates a familial relationship between the individuals identified within the image data; and determining the candidate parameter values based on portions of the values of the first characteristic and the values of the second characteristic.

21. The computer-implemented method of claim 14, further comprising:

applying a trained object recognition process to one or more elements of the image data;

based on the application of the trained object recognition process, recognizing a physical object within the image data and determining an object type associated with the recognized physical object;

generating and transmitting a third signal to a third-party device that requests a value of a second characteristic of the recognized physical object;

receiving a fourth signal that includes the value of the second characteristic; and determining the candidate parameter values based on portions of the values of the first characteristic, the relationship data, the object type, and the value of the second characteristic.

22. A device, comprising:

a display unit;

a communications unit;

a storage unit storing instructions; and at least one processor coupled to the display unit, the communications unit, and the storage unit, the at least one processor being configured to execute the instructions to:

generate and transmit, via the communications unit, a first signal to a computing system, the first signal comprising image data that identifies a plurality of individuals associated with an exchange of data;

receive, via the communications unit, a second signal from the computing system, the second signal comprising candidate parameter values characterizing the data exchange, the candidate parameter values representing discrete elements of a policy associated with the data exchange; and perform operations that display, using the display unit, the candidate parameter values within a corresponding portion of a digital interface, wherein the first signal comprises information that causes the computing system to execute an application program, the executed application program performing operations that, apply a trained machine learning process to elements the image data, and based on the application of the trained machine learning process to the elements of the image data, determine, for each of the individuals, a value of a characteristic of the corresponding individual, and generate relationship data characterizing a structure of a familial relationship between the individuals based at least in part on the values of the first characteristic associated with the individuals, and that determine the candidate parameter values based on portions of the characteristic values and the relationship data.

* * * * *